(12) United States Patent
Drumm

(10) Patent No.: US 12,134,867 B2
(45) Date of Patent: Nov. 5, 2024

(54) SHIFTABLE CABIN

(71) Applicant: Wirtgen GmbH, Windhagen (DE)

(72) Inventor: Stephan Drumm, Vettelschoß (DE)

(73) Assignee: Wirtgen GmbH, Windhagen (DE)

( * ) Notice: Subject to any disclaimer, the term of this patent is extended or adjusted under 35 U.S.C. 154(b) by 295 days.

(21) Appl. No.: 17/562,136

(22) Filed: Dec. 27, 2021

(65) Prior Publication Data

US 2023/0044267 A1    Feb. 9, 2023

Related U.S. Application Data

(60) Provisional application No. 63/229,790, filed on Aug. 5, 2021.

(51) Int. Cl.
  *E01C 23/088*  (2006.01)
  *E01C 23/12*  (2006.01)
  (Continued)

(52) U.S. Cl.
  CPC .......... *E01C 23/088* (2013.01); *E01C 23/127* (2013.01); *B60G 17/00* (2013.01);
  (Continued)

(58) Field of Classification Search
  CPC ...... E02F 9/166; E01C 23/088; E01C 23/127; E01C 2301/30; B60G 17/00;
  (Continued)

(56) References Cited

U.S. PATENT DOCUMENTS 3,182,605 A    5/1965  Brasher
4,436,169 A *  3/1984  Jennerjohn ............. B66C 13/54
                                                          414/917

(Continued)

FOREIGN PATENT DOCUMENTS

CN          202641889 U      1/2013
JP           05255950 A      10/1993
WO    WO-2022234190 A1 *    11/2022

OTHER PUBLICATIONS

Extended Search Report for corresponding European patent application No. 22163688.9 dated Aug. 26, 2022, 6 pages (not prior art).

*Primary Examiner* — Taras P Bemko
*Assistant Examiner* — Michael A Goodwin
(74) *Attorney, Agent, or Firm* — Lucian Wayne Beavers; Patterson Intellectual Property Law, PC

(57) ABSTRACT

A road milling machine includes a machine frame having a longitudinal axis. A plurality of ground engaging units support the machine frame from a ground surface. A milling drum is supported from the machine frame. An operator's station is supported from the machine frame by a support linkage configured to move the operator's station laterally between an inner position and an outer position relative to the machine frame. The support linkage includes at least one pivot link extending between the machine frame and the operator's station and oriented to pivot about a pivot axis extending parallel to the longitudinal axis of the machine frame. The operator's station in the outer position extends laterally partially beyond the machine frame on one of the left and right edges of the machine frame, the outer position being at a higher elevation than the inner position relative to the machine frame.

20 Claims, 17 Drawing Sheets

(51) Int. Cl.
 *B60G 17/00* (2006.01)
 *B62D 33/063* (2006.01)
 *E02F 9/16* (2006.01)
 *F15B 1/02* (2006.01)

(52) U.S. Cl.
 CPC ........ *B60G 2500/30* (2013.01); *B62D 33/063* (2013.01); *E01C 2301/30* (2013.01); *E02F 9/166* (2013.01); *F15B 1/021* (2013.01)

(58) Field of Classification Search
 CPC ... B60G 2500/30; F15B 1/021; B62D 33/063; B62D 33/0636; B66C 13/54
 See application file for complete search history.

(56) References Cited

U.S. PATENT DOCUMENTS

| | | | |
|---|---|---|---|
| 6,106,073 | A | 8/2000 | Simons et al. |
| 8,590,983 | B2 | 11/2013 | Berning et al. |
| 9,783,056 | B2 | 10/2017 | Klein et al. |
| 10,960,938 | B2 | 3/2021 | Doy et al. |
| 10,968,576 | B2 | 4/2021 | Wagner et al. |
| 11,001,315 | B2 | 5/2021 | Johnson et al. |
| 2008/0258535 | A1* | 10/2008 | Berning .................. E01C 23/01 299/39.4 |
| 2009/0010713 | A1* | 1/2009 | Kotting ................. E01C 23/088 404/128 |
| 2014/0225417 | A1 | 8/2014 | Meinders et al. |
| 2020/0198709 | A1* | 6/2020 | Doy .......................... E02F 9/16 |
| 2020/0392678 | A1* | 12/2020 | Ponstein ............ B62D 33/0621 |

* cited by examiner

SHIFTABLE CABIN

BACKGROUND

1. Field of the Disclosure

The present disclosure relates to improvements in the mounting of an operator's station on a road milling machine so that the operator's station can be laterally shifted to extend over an edge of a machine frame of the milling machine.

2. Description of the Prior Art

Road milling machines are typically designed to have at least one zero clearance side wherein the milling machine can mill close to an obstacle. It is desirable for the operator of the milling machine to be able to directly observe the cutting action of the milling drum, particularly on the zero clearance side. To that end various arrangements have been provided for laterally shifting a cabin or an operator's station outward toward the zero clearance side to provide the operator with an improved view of the milling operation.

One example of such an arrangement is seen in U.S. Pat. No. 10,960,938. A particular disadvantage of that arrangement is that to achieve the lateral displacement of the operator's station the operator's station is moved through an arc in a horizontal plane of the operator's station such that in addition to the lateral displacement there is a fore and aft movement of the operator's station relative to the machine frame. This movement occupies valuable floor space on the machine frame and all of the volume above that floor space which cannot be used for other purposes because it must be kept clear for the movement of the operator's station.

Accordingly, there is a continuing need for improved arrangements for shiftable operator's stations or cabins on such construction machines.

SUMMARY OF THE DISCLOSURE

In one embodiment a self-propelled road milling machine includes a machine frame having a longitudinal axis extending between a front and a rear of the machine frame, the machine frame including left and right edges. A plurality of ground engaging units support the machine frame from a ground surface. A milling drum is supported from the machine frame. An operator's station is supported from the machine frame by a support linkage configured to move the operator's station laterally between an inner position and an outer position relative to the machine frame. The support linkage includes at least one pivot link extending between the machine frame and the operator's station, the at least one pivot link being oriented to pivot about a pivot axis extending parallel to the longitudinal axis of the machine frame. The operator's station in the outer position extends laterally partially beyond one of the left and right edges of the machine frame. The outer position is at a higher elevation than the inner position relative to the machine frame.

In another embodiment the milling machine may include a hydraulic lifting cylinder connected to at least one of the support linkage and the operator's station, the hydraulic lifting cylinder being configured to move the operator's station between the inner and outer positions.

In any of the above embodiments the milling machine may include a hydraulic accumulator hydraulically communicated with the hydraulic lifting cylinder and configured to provide a hydraulic spring support to the operator's station at least when the operator's station is in the outer position.

In any of the above embodiments the milling machine may include a hydraulic flow restrictor disposed between the hydraulic lifting cylinder and the hydraulic accumulator and configured to restrict flow of hydraulic fluid in at least one direction between the hydraulic lifting cylinder and the hydraulic accumulator to dampen the hydraulic spring support of the operator's station.

In any of the above embodiments the milling machine may include an extension sensor configured to provide an extension signal corresponding to an extension of the hydraulic lifting cylinder.

Any of the above embodiments may include a proximity sensor configured to detect the presence of the operator's station in the outer position relative to the machine frame.

In any of the above embodiments the hydraulic lifting cylinder may be a smart cylinder and the extension sensor may be integral to the hydraulic lifting cylinder.

In any of the above embodiments the support linkage may be configured to move the operator's station laterally between the inner position and the outer position without any fore or aft movement of the operator's station relative to the machine frame such that a footprint of the operator's station over the machine frame when moving between the inner and outer positions is minimized.

In any of the above embodiments the milling machine may include a lifting actuator connected to at least one of the support linkage and the operator's station.

In any of the above embodiments the lifting actuator may be connected between the machine frame and the operator's station.

In any of the above embodiments the outer position of the operator's station, as compared to the inner position, may provide a human operator on the operator's station both an improved view of an area of the ground surface adjacent the milling drum due to the laterally outward movement, and an improved overall view around the self-propelled road milling machine due to the higher elevation of the outer position.

In any of the above embodiments when the operator's station is in the inner position a stationary footprint of the operator's station may fall entirely between left and right edges of the machine frame.

In any of the above embodiments the plurality of ground engaging units may include at least one front ground engaging unit and at least two rear ground engaging units, and at least one of the rear ground engaging units may be a movable rear ground engaging unit movable relative to the machine frame between a retracted position and an extended position. The milling drum may be located such that when the movable rear ground engaging unit is in the retracted position the movable rear ground engaging unit is located ahead of the milling drum. The outer position of the operator's station may extend laterally partially beyond the one of the left and right edges of the machine frame adjacent the movable rear ground engaging unit.

In another embodiment the two rear ground engaging units may be laterally aligned and the milling drum may be located laterally between the two rear ground engaging units when the movable rear ground engaging unit is in the extended position, and the operator's station when in the outer position may be at least partially located above a location in which the movable rear ground engaging unit would be located if the movable rear ground engaging unit was in the extended position.

In any of the above embodiments the milling machine may include at least two lifting columns extending between the at least two rear ground engaging units and the machine frame for raising and lowering the machine frame relative to the ground surface, one of the lifting columns being a movable lifting column attached to the movable rear ground engaging unit. Further the operator's station may include a recess configured to at least partially receive the movable lifting column when the movable rear ground engaging unit is in the extended position and the operator's station is in the outer position.

In a first mode of operation of any of the above embodiments a controller may be configured to receive an extension signal from the extension sensor and a pressure signal from a pressure sensor associated with the hydraulic lifting cylinder, and to generate control signals to the hydraulic lifting cylinder, the controller being configured such that when the operator's station is moved toward the outer position, if the movable ground engaging unit and the movable lifting column are in the extended position and the operator's station engages the movable lifting column, the controller detects a rise in hydraulic pressure within the hydraulic lifting cylinder and directs the hydraulic lifting cylinder to retract a predetermined distance to provide a predetermined clearance between the operator's station and the movable lifting column in the outer position of the operator's station.

In a second mode of operation of any of the above embodiments the controller may be configured to receive a proximity signal from a proximity sensor configured to detect a proximity of the operator's station to the movable lifting column, and to generate control signals to the lifting actuator, the controller being configured such that when the operator's station is moved toward the outer position, if the movable ground engaging unit and the movable lifting column are in the extended position and the proximity sensor detects the operator's station within a predetermined distance of the movable lifting column, the controller directs the lifting actuator to stop moving so as to provide a predetermined clearance between the operator's station and the movable lifting column in the outer position of the operator's station.

In a third mode of operation of any of the above embodiments the pivoting mechanism which moves the movable ground engaging unit and the movable lifting column may be configured such that the most extended position of the movable lifting column is located such that the movable lifting column cannot interfere with the operator's station, even if the operator's station is in its outermost position.

In a fourth mode of operation of any of the above embodiments the lifting mechanism which moves the operator's station may be configured such that the laterally outward movement from inner position always terminates at an intermediate position which is chosen such that a clearance is provided between the operator's station and the movable lifting column if the lifting column is in its extended position. By so limiting the outer position of the operator's station it is insured that the movable lifting column cannot interfere with the operator's station, even if the movable lifting column is in its fully extended position.

In a fifth mode of operation of any of the above embodiments the human operator is provided with an operational interface which allows the operator to select between the third mode and the fourth mode.

In a sixth mode of operation of any of the above embodiments the controller may be configured to receive a proximity signal from a proximity sensor configured to detect a proximity of the movable lifting column to the operator's station and to generate control signals to the extension actuator, the controller being configured such that when the operator's station is in the outer position, and the proximity sensor detects the operator's station within a predetermined distance of the movable lifting column, the controller directs the extension actuator to stop so as to provide a predetermined clearance between the operator's station and the movable lifting column in the extended position of the movable rear ground engaging unit and the movable lifting column.

Numerous objects, features and advantages of the present invention will be readily apparent to those skilled in the art upon a review of following description in conjunction with the accompanying drawings.

DETAILED DESCRIPTION

Figure 1:
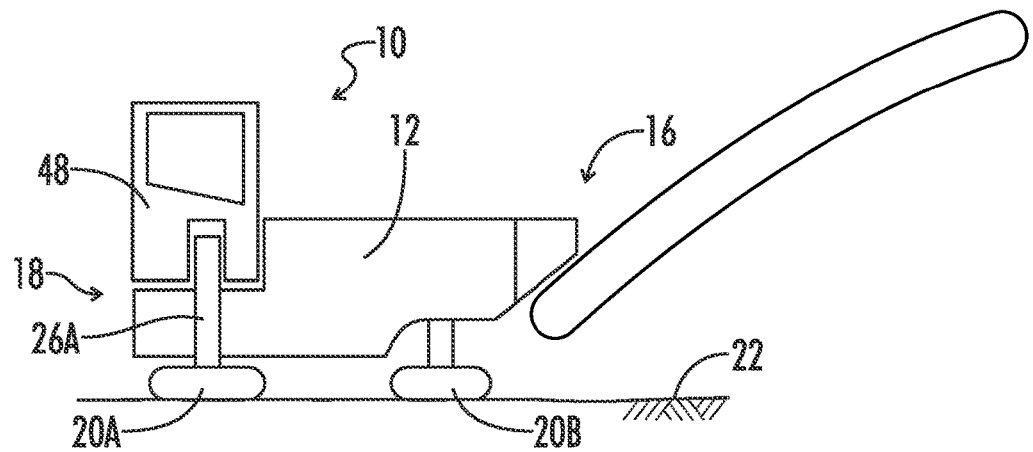
FIG. 1 is a schematic right side elevation view of a road milling machine.
Figure 2:
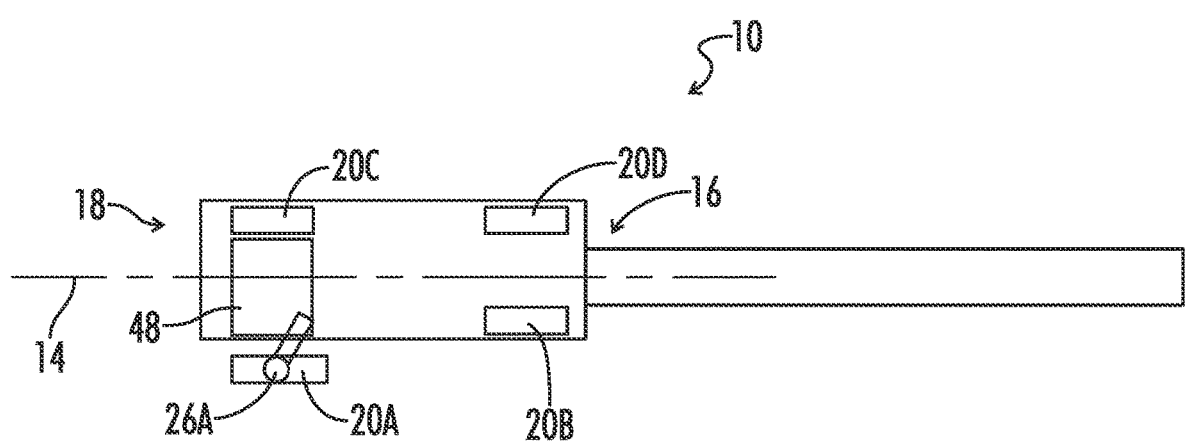
FIG. 2 is schematic plan view of the road milling machine of FIG. 1.

FIGS. 1 and 2 show a construction machine in the form of a self-propelled road milling machine generally designated as 10. The road milling machine 10 includes a machine frame 12 having a longitudinal axis 14 extending between a front 16 and a rear 18 of the machine frame 12. The road milling machine 10 illustrated is of the type sometimes referred to as a compact milling machine which is characterized by a milling drum located between the rear wheels or tracks and by a pivotable right rear wheel or track.

Figure 18:
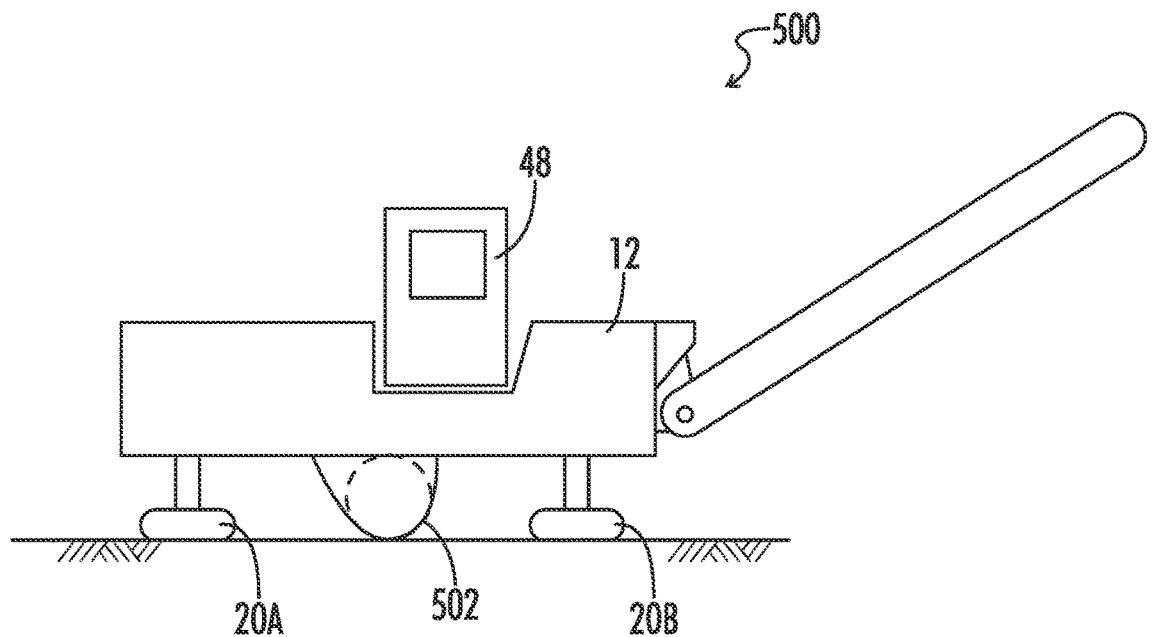
FIG. 18 is a schematic right side elevation view of a road milling machine in the form of a "large" milling machine having two front tracks and two rear tracks, and incorporating a shiftable cabin according to some aspects of the present disclosure.
Figure 19:
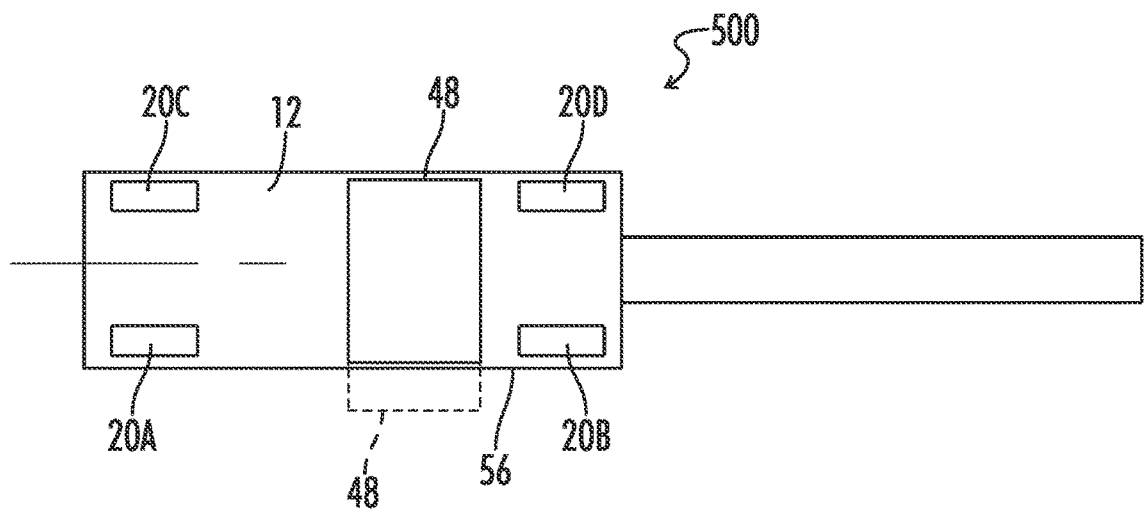
FIG. 19 is schematic plan view of the road milling machine of FIG. 18.

It will be understood that many aspects of the present invention are also applicable to other types of construction machines, including the so called "large" or "half-lane" milling machines characterized by two front and two rear tracks with a milling drum located between the front and rear tracks, such as shown for example in U.S. Pat. No. 10,968,576, the details of which are incorporated herein by reference. An example of a "large" milling machine like that of U.S. Pat. No. 10,968,576 incorporating the present invention is shown in FIGS. 18 and 19. Also, some aspects of the invention may be used with "half-lane" milling machines which use two front ground engaging units and one rear ground engaging unit.

A plurality of ground engaging units 20A, 20B, 20C and 20D support the machine frame 12 from a ground surface 22. In the embodiment illustrated in FIGS. 1 and 2 there are two front ground engaging units 20B and 20D and two rear ground engaging units 20A and 20C. In general, the milling machine 10 may have at least one front ground engaging unit and at least two rear ground engaging units. The ground engaging units are illustrated as tracked units, but wheeled units may also be used. One or more of the ground engaging units may be powered such as by a hydraulic motor to drive the milling machine 10. One or more of the ground engaging units may be steerable.

At least one of the rear ground engaging units, in the illustrated embodiment the right rear ground engaging unit 20A, may be a movable rear ground engaging unit 20A movable relative to the machine frame 12 between a retracted position 20A' and a fully extended position 20A'''. The movable ground engaging unit may also be movable to one or more intermediate extended positions such as 20A''. Both the fully extended position 20A''' and the intermediate extended position 20 A'' may be referred to as extended positions. In FIGS. 1 and 2 the right rear ground engaging unit 20A is shown in the fully extended position 20A'''. The retracted position 20A' and intermediate extended position 20A'' are schematically shown in FIG. 5 discussed below.

Figure 5:
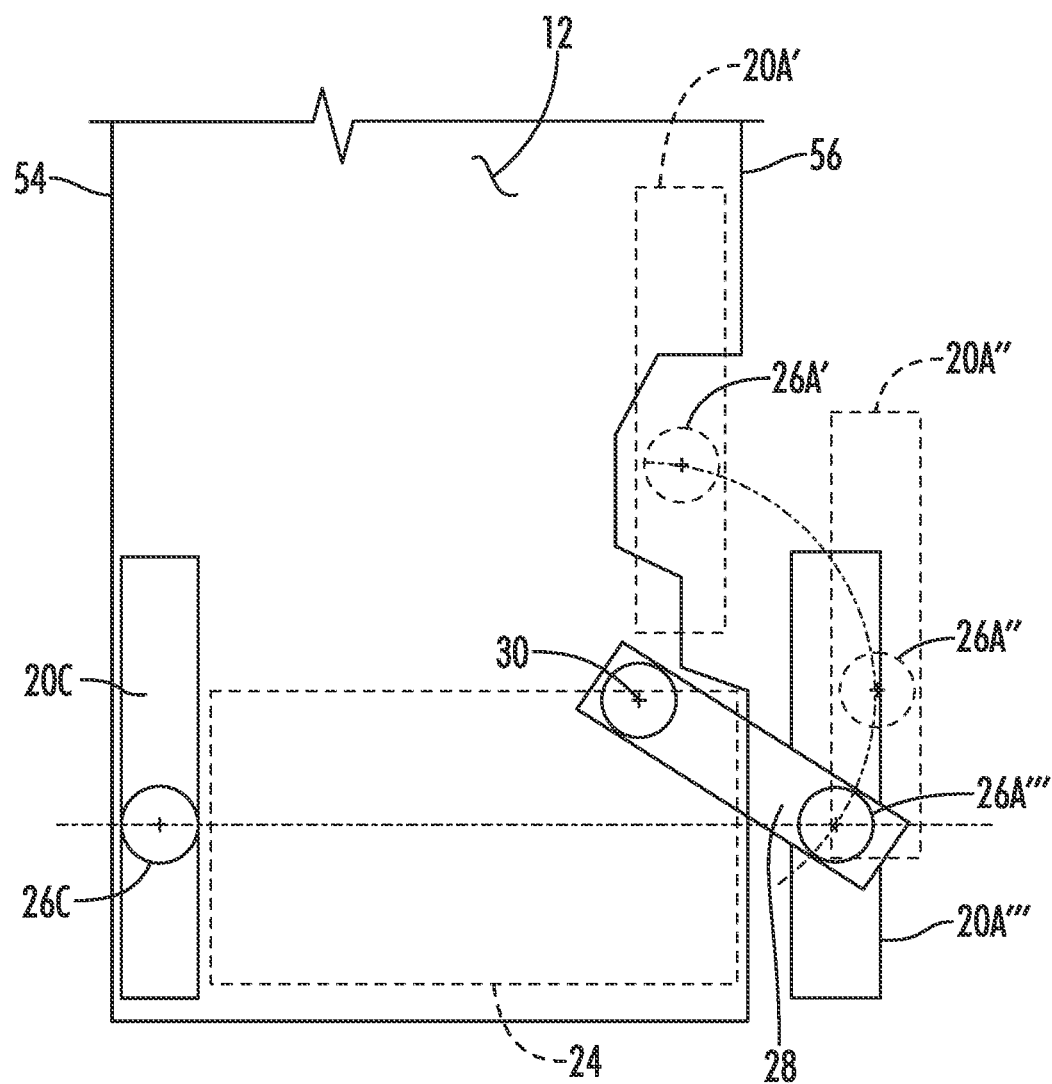
FIG. 5 is a schematic plan view of the rear portion of the road milling machine of FIG. 1 showing the right rear track in a fully extended position in solid lines, and in a retracted position and an intermediate extended position in dashed lines.

As schematically shown in FIG. 5, when the movable right rear ground engaging unit 20A is in the fully extended position 20A''', a milling drum 24 of the milling machine 10 is located laterally between the rear ground engaging units 20A and 20C. When the movable right rear ground engaging unit 20A is in the retracted position 20A' the movable right rear ground engaging unit 20A is located ahead of the milling drum 24.

At least the two rear ground engaging units 20A and 20C are connected to the machine frame 12 by lifting columns such as 26A and 26C. The lifting columns raise and lower the machine frame 12 and the attached milling drum 24 relative to the ground surface 22. At least the right rear lifting column 26A is a movable lifting column 26A attached to the movable rear ground engaging unit 20A.

Figure 9:
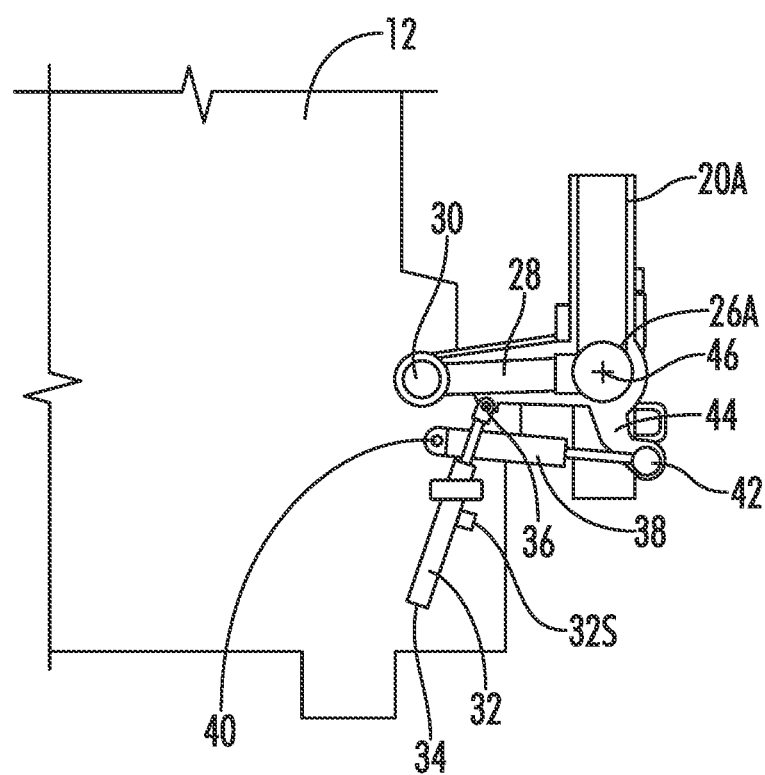
FIG. 9 is a plan view of the movable right rear track and lifting column of the road milling machine of FIG. 1, further showing an extension actuator, sometimes called a swing cylinder, for moving the right rear track and lifting column between the various positions of FIG. 5.

FIG. 9 shows the details of one embodiment of a mechanism for moving the movable ground engaging unit 20A and the movable lifting column 26A between the various positions relative to the machine frame. A swing arm 28 may be pivotally attached to machine frame 12 at pivotal connection 30, and pivotally attached to the movable ground engaging unit 20A via the movable lifting column 26A. An extension actuator 32 may be pivotally connected at one end 34 to the machine frame 12 and at the other end 36 to the swing arm 28 such that extension and retraction of the extension actuator 32 pivots the swing arm 28 and the attached lifting column 26A and ground engaging unit 20A between the various positions thereof. A steering actuator 38 is pivotally connected at one end 40 to the machine frame 12 and at the other end 42 to a steering arm 44 attached to the movable ground engaging unit 20A. Extension and retraction of the steering actuator 38 pivots the movable ground engaging unit 20A about a steering axis 46 relative to the movable lifting column 26A. In an embodiment either or both of the actuators 32 and 38 may be hydraulic cylinders and may be "smart" hydraulic cylinders including integral extension sensors as further explained below with reference to FIG. 11.

When the movable ground engaging unit 20A is in the retracted position 20A' the movable lifting column is in its corresponding retracted position 26A'. When the movable ground engaging unit 20A is in its intermediate extended position 20A'' the movable lifting column is in its corresponding intermediate extended position 26A''. When the movable ground engaging unit 20A is in its fully extended position 20A''' the movable lifting column is in its corresponding fully extended position 26A'''. Both the intermediate extended position 26A'' and the fully extended position 26A''' may be referred to as extended positions of the movable lifting column 26A.

As is understood by those skilled in the art with reference to compact road milling machines of type shown, the movable right rear ground engaging unit 20A can be placed in the fully extended position 20A''' as seen in FIGS. 1 and 2 wherein the movable right rear ground engaging unit 20A is located laterally outside the milling drum 24 for increased stability during normal milling operations. And the movable right rear ground engaging unit 20A can be moved to the retracted position 20A' wherein the movable right rear ground engaging unit 20A does not extend laterally outside the machine frame 12 thus allowing the milling machine 10 to mill close to an obstacle such as a curb or wall.

Figure 7:
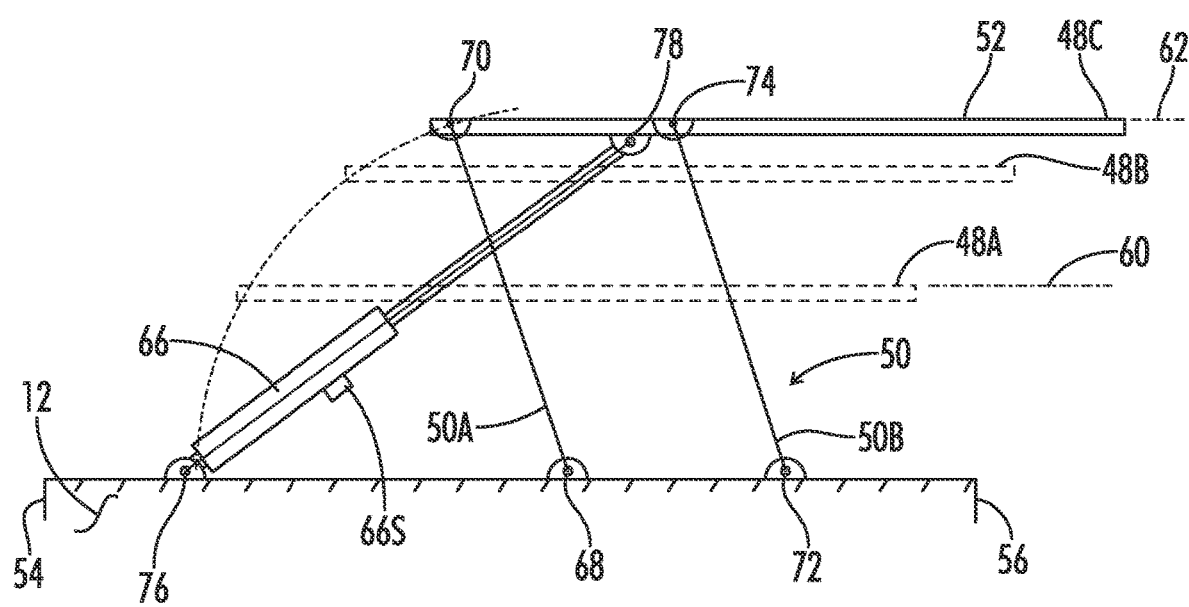
FIG. 7 is a schematic rear elevation view of a support linkage supporting the operator's station from the machine frame of the road milling machine. The operator's station is shown in an outermost position in solid lines, and in an inner position and an intermediate outer position in dashed lines. A hydraulic lifting cylinder is shown for moving the support linkage and the operator's station between the various positions.

As can be appreciated in viewing FIG. 7, as the pivot links 50A and 50B pivot from the inner position 48A of the operator's station 48 to the outer position 48C, the pivot links 48A and 48B pivot from a less vertical orientation to a more vertical orientation. In the further example of FIGS. 12 and 13 discussed below, it is seen that in the outer position of the operator's station 48 the pivot links 50A and 50B may be in a substantially vertical orientation.

In an embodiment, when the movable right rear ground engaging unit 20A is placed in the fully extended position 20A''' the two rear ground engaging units are laterally aligned and the milling drum is located laterally between the two rear ground engaging units so that the rotational axis of the milling drum is substantially aligned laterally with the rotational axes of the two rear ground engaging units. When so aligned the rotational axes of the milling drum and the two rear ground engaging units may intersect a center of steering of the milling machine 10 when the milling machine 10 is configured to be steered in the so-called Ackermann steering condition.

Figure 3:
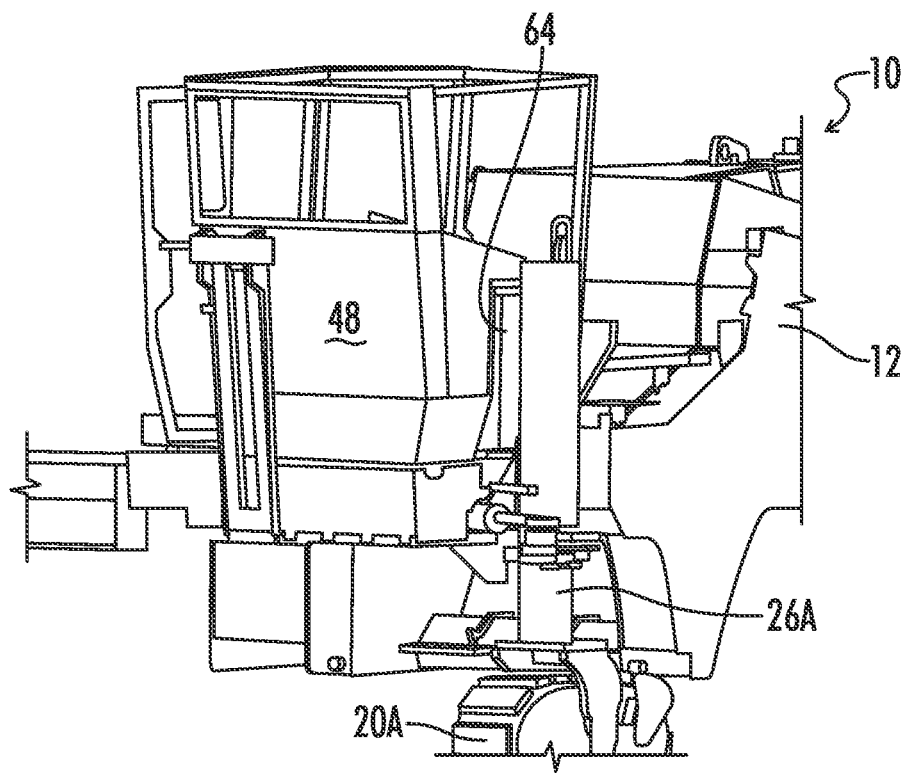
FIG. 3 is right rear perspective view of the road milling machine of FIG. 1 showing the operator's station in an inner position.
Figure 4:
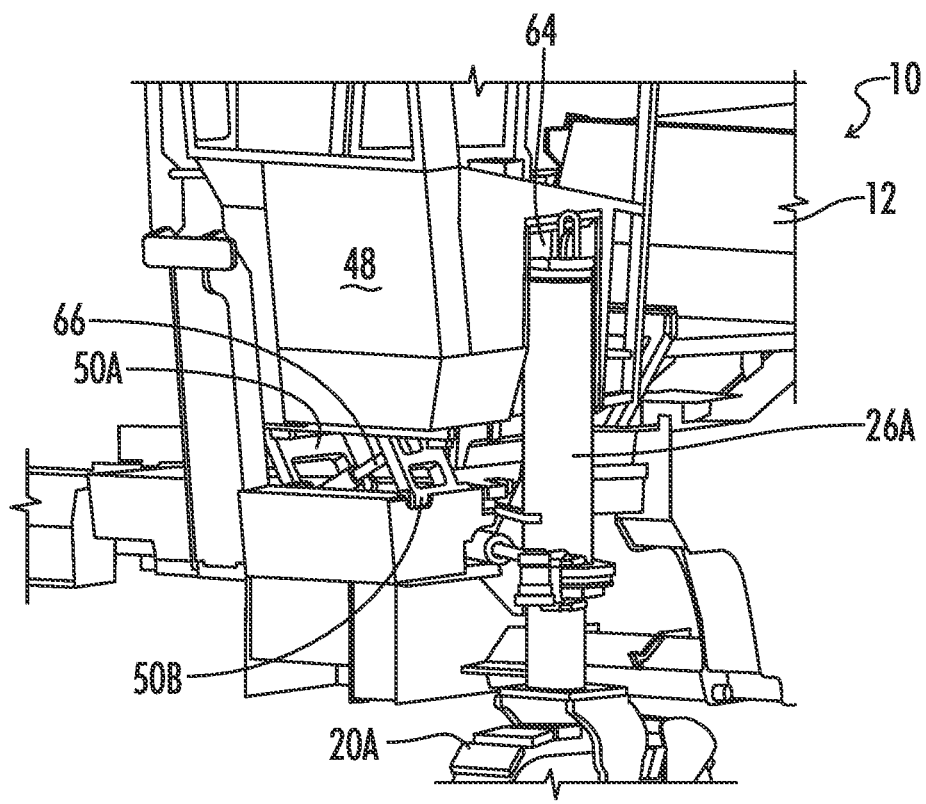
FIG. 4 is right rear perspective view of the road milling machine of FIG. 1 showing the operator's station in an outer position.

As best seen in FIGS. 3 and 4 milling machine 10 may include a movable operator's station 48 which may be an enclosed cabin or may be an open operator's station. As schematically shown in FIG. 7 a support linkage 50 is configured to move the operator's station 48 laterally between an inner position 48A, and intermediate outer position 48B and an outermost position 48C relative to the machine frame 12. In the inner position 48A the operator's station 48, including a floor 52 thereof, is located at a lowest elevation 60 schematically shown in FIG. 7, and has a footprint entirely within the left and right edges 54 and 56 of the machine frame 12. In the outermost position 48C the operator's station 48 extends laterally partially beyond the right edge 56 of machine frame 12 by a distance 58 (see FIG. 6) and the floor 52 is at a higher elevation schematically shown as 62 in FIG. 7. Both the intermediate outer position 48B and the outermost position 48C may be referred to as outer positions of the operator's station 48.

Figure 6:
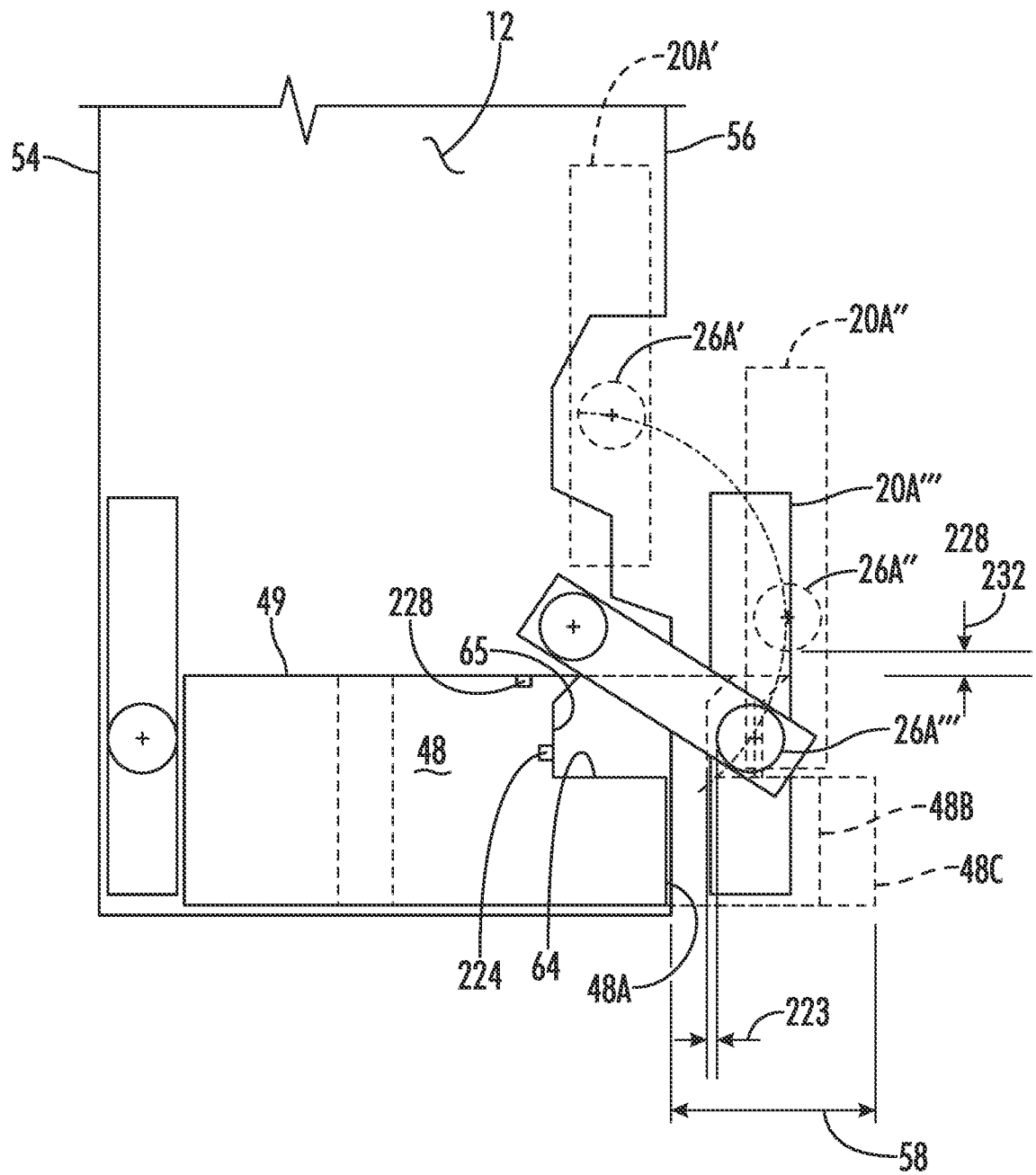
FIG. 6 is a schematic plan view of the rear portion of the road milling machine similar to FIG. 5, further schematically showing the operator's station in an inner position in solid lines, and in an outermost position and an intermediate outer position in dashed lines.

As is best shown in the schematic illustration of FIG. 6, when the operator's station 48 is in the outermost position 48C it is at least partially located above the fully extended position 20A''' of the movable rear ground engaging unit 20A. To allow this superposition of positions the operator's station 48 may include a recess 64 configured to at least partially receive the movable lifting column 26A when the movable rear ground engaging unit 20A is in the fully extended position 20A''' and the operator's station 48 is in the outermost position 48C.

A hydraulic lifting cylinder 66, may be connected between the machine frame 12 and at least one of the support linkage 50 and the operator's station 48. The hydraulic lifting cylinder 66 may be configured to move the operator's station between the inner position 48A and the outermost position 48C. The hydraulic lifting cylinder 66 may be a "smart" hydraulic cylinder including an integral extension sensor 66S configured to provide an extension signal corresponding to an extension of the hydraulic lifting cylinder 66 as further explained below with reference to FIG. 11. The extension signal also corresponds to the position of the operator's station 48 relative to the machine frame 12. The hydraulic lifting cylinder 66 may also be referred to as a lifting actuator 66. As is further explained below, more generally the lifting actuator 66 may be described as being connected to at least one of the support linkage 50 and the operator's station 48.

In an embodiment the support linkage 50 may be configured to move the operator's station 48 laterally between the inner position 48A and the outermost position 48C without any fore or aft movement of the operator's station 48 relative to the machine frame 12 such that a footprint of the operator's station 48 over the machine frame 12 when moving between the inner and outermost positions 48A and 48C is minimized.

Such a configuration of the support linkage 50 may be provided by constructing the support linkage 50 to include two pivot links 50A and 50B extending between the machine frame 12 and the operator's station 48. Pivot link 50A is pivotally connected to machine frame 12 to pivot about pivot axis 68 and to operator's station 48 to pivot about pivot axis 70. Pivot link 50B is pivotally connected to machine frame 12 to pivot about pivot axis 72 and to operator's station 48 to pivot about pivot axis 74. The pivot axes 68, 70, 72 and 74 may all extend parallel to the longitudinal axis 14 of machine frame 12. In one embodiment the pivot links 50A and 50B may be of equal lengths.

It will be understood that the pivot links 50A and 50B may be attached directly to machine frame 12 or to a separate component fixedly attached to machine frame 12. And the pivot links 50A and 50B may be attached directly to the operator's station 48 or to a separate component fixedly attached to operator's station 48.

In an embodiment as schematically shown in FIG. 7 the lifting cylinder 66 may be pivotally connected at pivot point 76 to the machine frame 12 and at pivot point 78 to the operator's station 48. In another embodiment as shown in FIG. 4 the hydraulic lifting cylinder 66 may have its upper end pivotally connected to one of the pivot links such as pivot link 50B.

Figure 12:
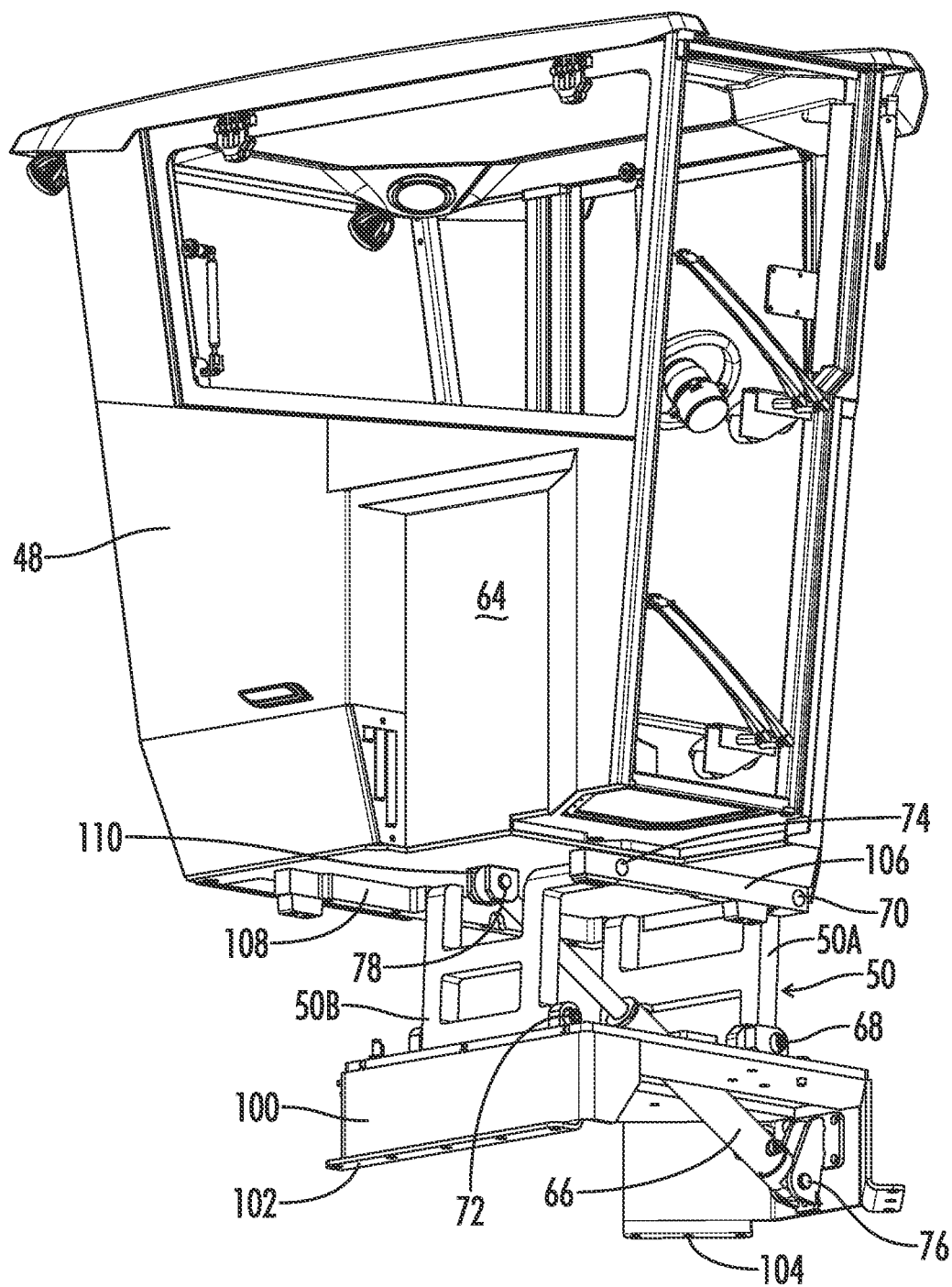
FIG. 12 is a right front side lower perspective view of the operator's station and one embodiment of the lifting linkage and lifting actuator.
Figure 13:
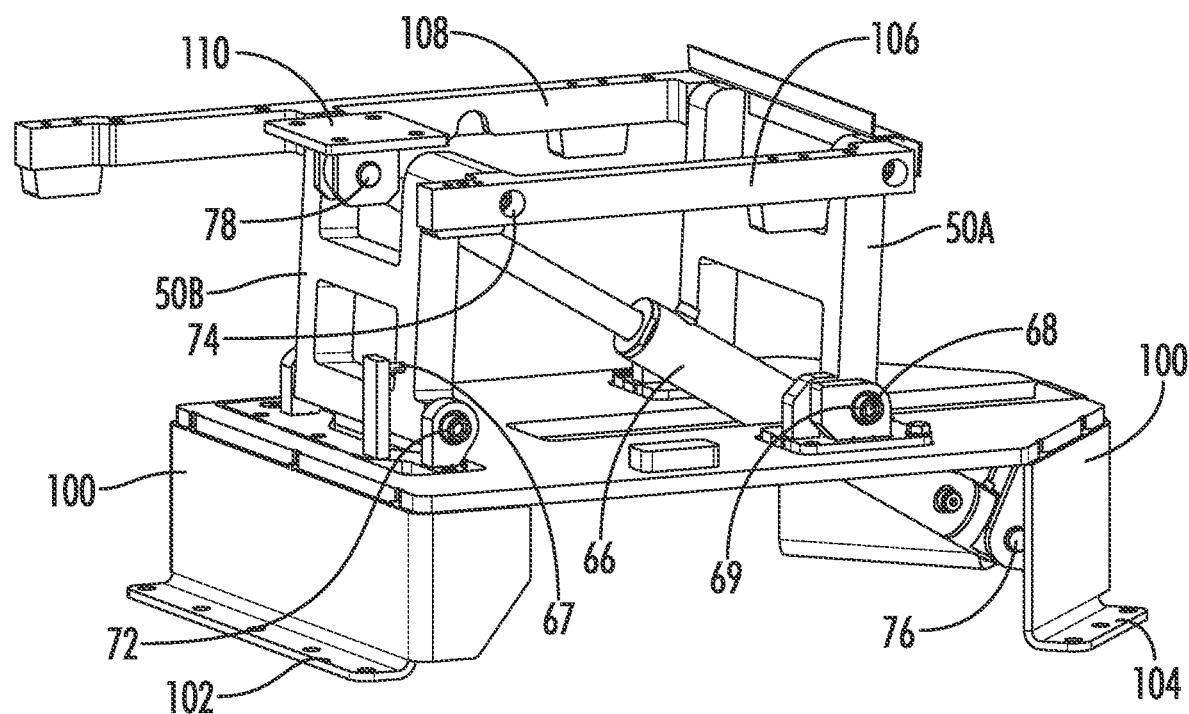
FIG. 13 is an enlarged perspective view of the lifting linkage and lifting actuator of FIG. 12.

FIGS. 12 and 13 show in greater detail the construction of the embodiment of the lifting linkage 50 and the hydraulic lifting cylinder 66 shown in FIG. 4. In this embodiment a lower mounting platform 100 has flanges 102 and 104 constructed to be attached to the machine frame 12 via bolts so that the mounting platform 100 effectively becomes part of the machine frame 12. The previously described pivotal connection 76 of the lifting actuator 66 to frame 12, and the pivotal connections 68 and 72 of the pivot links 50A and 50B to the machine frame 12 are formed on the lower mounting platform 100. Upper ends of the pivot links 50A and 50B are joined together by support bars 106 and 108 which are configured to be bolted to the lower surface of the operator's platform 48, so that the support bars 106 and 108 effectively become part of the operator's platform 48. The pivotal connections 70 and 74 of the upper ends of the pivot links 50A and 50B to the operator's station 48 are formed with the support bars 106 and 108. The upper end of the lifting actuator 66 and at its pivotal connection 78 is attached to a mounting bracket 110 which is separately bolted to the operator's platform 48. Thus, the entire assembly of the lifting linkage 50 and the lifting actuator 66 can be removed by unbolting the lower mounting platform 100 from machine frame 12 and unbolting the support bars 106 and 108 and the mounting bracket 110 from the bottom of the operator's station 48.

In an embodiment the hydraulic lifting cylinder 66 can be a conventional, or "dumb", hydraulic cylinder. When using such a conventional hydraulic cylinder 66 the position of the operator's station 48 relative to the machine frame 12 may be detected via various position sensor arrangements. In one embodiment a proximity sensor 67 may be arranged so as to detect when the pivot link 50B has reached a position corresponding to either the outer position 48C or the intermediate outer position 48B. In another embodiment a rotary angle sensor 69 may be placed on one of the pivot axes 68, 70, 72 or 74 to detect the relative rotation between the components of the support linkage 50 and/or the machine frame 12, which rotational angle can be correlated to the position of the operator's station 48 relative to the machine frame 12.

Figure 8A:
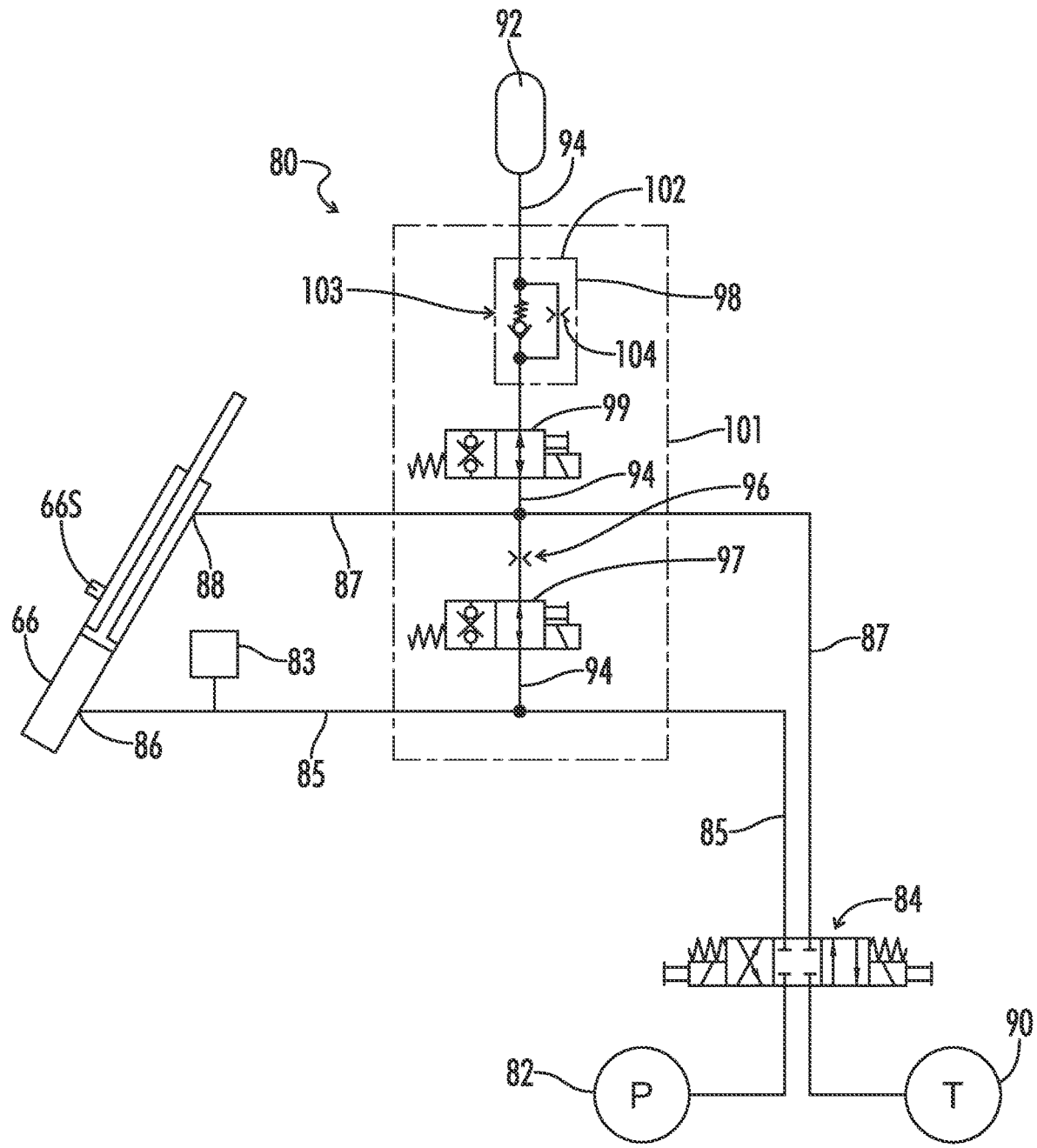
FIG. 8A is a schematic illustration of a hydraulic power supply associated with the lifting cylinder. The hydraulic power supply is in a first position wherein the lifting cylinder is locked in an extended position and a hydraulic spring feature is provided.
Figure 8B:
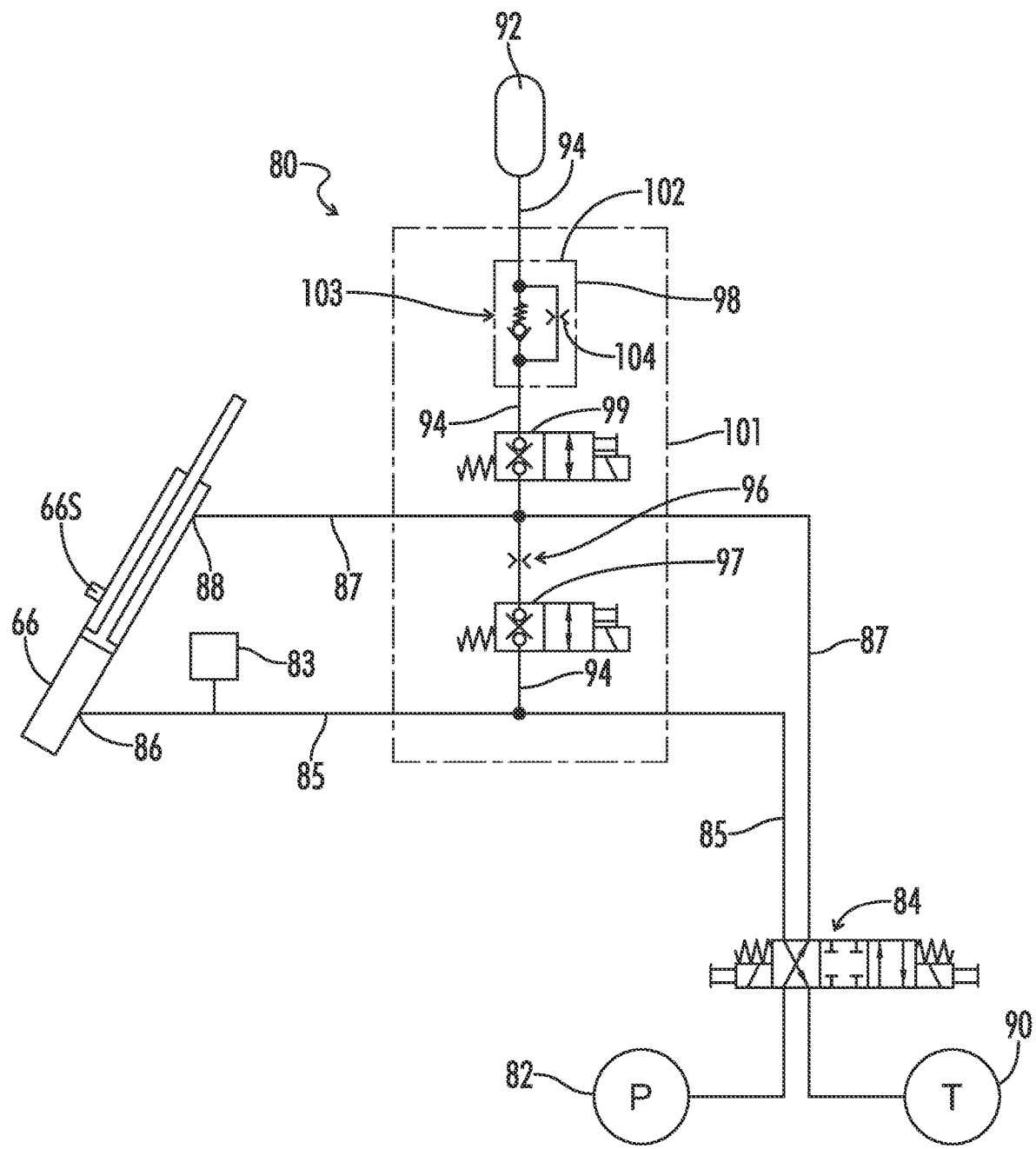
FIG. 8B is a schematic illustration similar to FIG. 8A, but with the hydraulic power supply in a second position wherein the lifting cylinder is being retracted to lower the operator's station and shift it inward. The hydraulic spring feature is blocked during lifting cylinder extension or retraction.

FIGS. 8A and 8B schematically show a hydraulic power supply system 80 which may be used with the hydraulic lifting cylinder 66. Pressurized hydraulic fluid may be provided from source 82, also identified as P, via a 3-way electro-hydraulic control valve 84 and supply lines 85 and 87 to either a cylinder end 86 or piston end 88 of the hydraulic lifting cylinder 66. Returning hydraulic fluid is directed by control valve 84 to a tank 90, also identified as T. A pressure sensor 83 may be connected to the supply line 85 and configured to provide a pressure signal 81 (see FIG. 10) corresponding to a hydraulic pressure within the cylinder end 86 of the hydraulic lifting cylinder 66. A second pressure sensor may be connected to supply line 87.

The configuration of the hydraulic lifting cylinder 66 as shown in FIG. 7 wherein the hydraulic lifting cylinder 66 is supporting the weight of the operator's station 48 against the force of gravity conveniently allows a hydraulic spring support to be provided by communicating a hydraulic accumulator 92 with the supply lines 85 and 87. The accumulator 92 may be connected to the supply lines 85 and 87 by a connecting line 94. The connecting line 94 may also connect the supply lines 85 and 87 to each other.

A two-way flow restrictor 96 and a control valve 97 may be disposed in the connecting line 94 between the supply lines 85 and 87.

A one-way flow restrictor 98 and a control valve 99 may be disposed in the portion of connecting line 94 connected to accumulator 92. The one-way flow restrictor 98 includes a check valve 103 allowing free flow to the accumulator 92 but preventing free flow from the accumulator 92. A bypass 102 in the one-way flow restrictor 98 includes a flow restrictor 104 which allows a restricted flow of hydraulic fluid from the accumulator 92 back to the supply lines 85, 87.

FIG. 8A shows the system 80 in a first position such as it would be in if the lifting cylinder 66 has been extended to move the operator's station 48 to the position 48C. The control valve 84 is in a position blocking further hydraulic flow to and from the lifting cylinder 66 so that no further adjustment of the lifting cylinder 66 is taking place. The control valves 97 and 99 are in the open position to allow the accumulator 92 to provide the hydraulic spring function.

With this arrangement impact loads which would otherwise be transmitted between the machine frame 12 and the operator's station 48 may be hydraulically damped, when the operator's station 48 is in the outermost position 48C or in the intermediate outer position 48B. The one-way flow restrictor 98 may be described as a hydraulic flow restrictor 98 disposed between the hydraulic lifting cylinder 66 and the hydraulic accumulator 92 and configured to restrict flow of hydraulic fluid in at least one direction between the hydraulic lifting cylinder 66 and the hydraulic accumulator 92 to dampen the hydraulic spring support of the operator's station 92.

FIG. 8B shows the system 80 in a second position as it would be in if the lifting cylinder 66 were being retracted to move the operator's station back toward the inner position 48A. The control valve 84 is in the left side operating position to control flow to and from the lifting cylinder 66. The control valves 97 and 99 are in their closed positions to block flow to and from the accumulator 92 and between the supply lines 85 and 87. A similar arrangement to extend the lifting cylinder would move the control valve 84 to the right side operating position and the control valves 97 and 99 would remain closed.

The broken line box 101 around the valves 97 and 99 and the flow restrictors 96 and 104 is to indicate that optionally those components may be constructed as one integral block of hydraulic components in which case the connecting passages such as 94 are integrally formed in the block. Those components can also be individual hydraulic components connected by separate hydraulic lines.

Optionally, the flow restrictors 96 and 104 can be either fixed flow restrictors having a fixed dimension flow path therethrough, or they may be variable restrictions having a variable dimension flow path therethrough. Variable restrictions allow the damping function to be adjusted.

Figure 11:
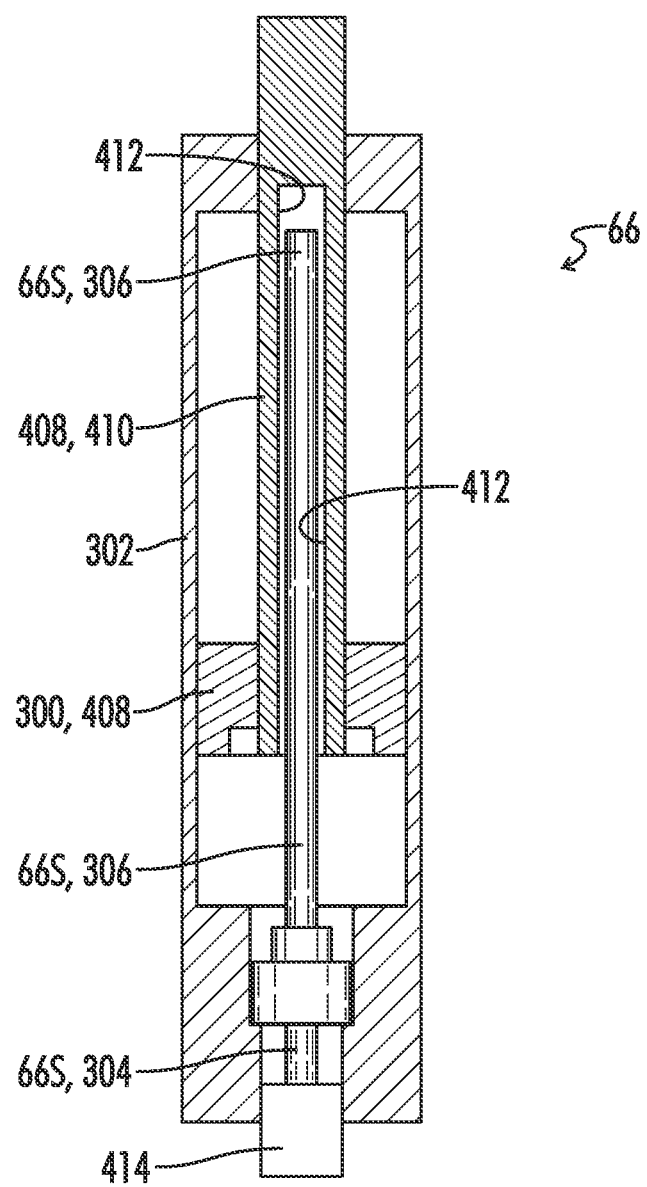
FIG. 11 is a schematic illustration of a hydraulic smart cylinder having an integral extension sensor.

As previously noted, the hydraulic lifting cylinder 66 and the extension actuator 32 may be "smart" hydraulic cylinders having integral extension sensors 66S and 32S respectively. A representative construction of such a "smart" hydraulic cylinder is shown in FIG. 11, and the details of a "smart" hydraulic lifting cylinder 66 will be described by way of example. FIG. 11 may also be representative of the internal construction of the other actuators herein described when those actuators are implemented as "smart" cylinders. In the illustrated embodiment, the actuator 66 is of a type sometimes referred to as "smart cylinder" which includes an integrated sensor 66S configured to provide a signal corresponding to an extension of the piston member 300 relative to the cylinder member 302 of the actuator 66.

The sensor 66S includes a position sensor electronics housing 304 and a position sensor coil element 306.

The piston portion 408 of actuator 66 includes a piston 408 and a rod 410. The piston 408 and rod 410 have a bore 412 defined therein, within which is received the position sensor coil element 306.

The actuator 66 is constructed such that a signal is provided at connector 414 representative of the position of the piston 408 relative to the position sensor coil element 306.

Such smart cylinders may operate on several different physical principles. Examples of such smart cylinders include but are not limited to magnetostrictive sensing, magnetoresistive sensing, resistitve (potentiometric) sensing, Hall effect sensing, sensing using linear variable differential transformers, and sensing using linear variable inductance transducers.

Figure 10:
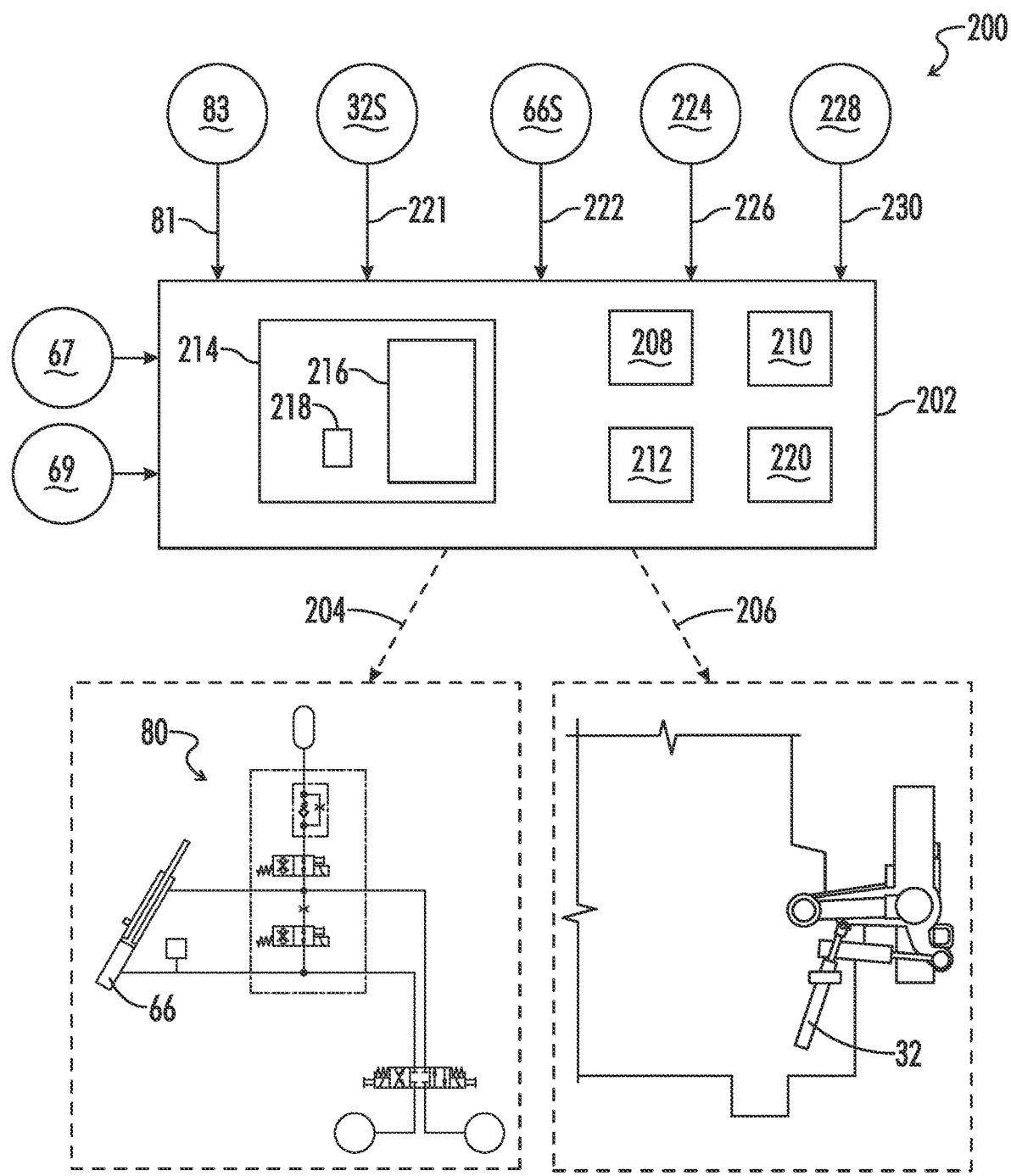
FIG. 10 is a schematic view of a controller of the road milling machine along with the various sensor inputs and control outputs associated with the controller.

FIG. 10 schematically illustrates the sensors associated with each of the actuators 66 and 32 by the same number as used for the actuator with the addition of the suffix "S". Thus, hydraulic lifting cylinder 66 may include integral extension sensor 66S and extension actuator 32 may include integral extension sensor 32S. Extension sensor 66S provides a signal 222 corresponding to the extension of the lifting cylinder 66 and the position of the operator's station 48. Extension sensor 32S provides a signal 221 corresponding to the extension of extension actuator 32 and the position of the movable ground engaging unit 20A and the movable lifting column 26A.

Alternate Embodiments of Lifting Linkage and Lifting Actuator:

FIGS. 14-17B illustrate several alternate embodiments of lifting linkages and/or lifting actuators. With reference to the arrangement of the milling machine 10 seen in FIGS. 1 and 2, the FIGS. 14-17B are schematic front elevation views of the alternative embodiments. This is in contrast to the schematic FIG. 6 showing the lifting linkage 50 which is a rear elevation view. Thus, the left and right edges 54 and 56 of machine frame 12 seen in FIG. 7, and now reversed in FIGS. 14-17B.

The lifting linkage 50 discussed above included two pivot links each extending between the machine frame 12 and the operator's station 48, the two pivot links each being oriented to pivot about a respective pivot axis extending parallel to the longitudinal axis of the machine frame 12. The alternate embodiments of FIGS. 14-17B each include only one such pivot link. Thus, in general all of the embodiments can be described as including at least one pivot link extending between the machine frame 12 and the operator's station 48, the at least one pivot link being oriented to pivot relative to the machine frame 12 about a pivot axis extending parallel to the longitudinal axis of the machine frame 12.

Also, in the embodiment illustrated in FIGS. 3, 4, 12 and 13, the lifting actuator is a hydraulic cylinder, whereas the alternative embodiments show that other types of actuators, for example a rotary threaded spindle and nut, may be used. Also as shown in these embodiments the lifting actuator does not have to be attached to either the machine frame 12 or the operator's station 48 but may instead be connected between the various links of the lifting linkage. In general, the lifting actuator may be any suitable actuator.

Figure 14:
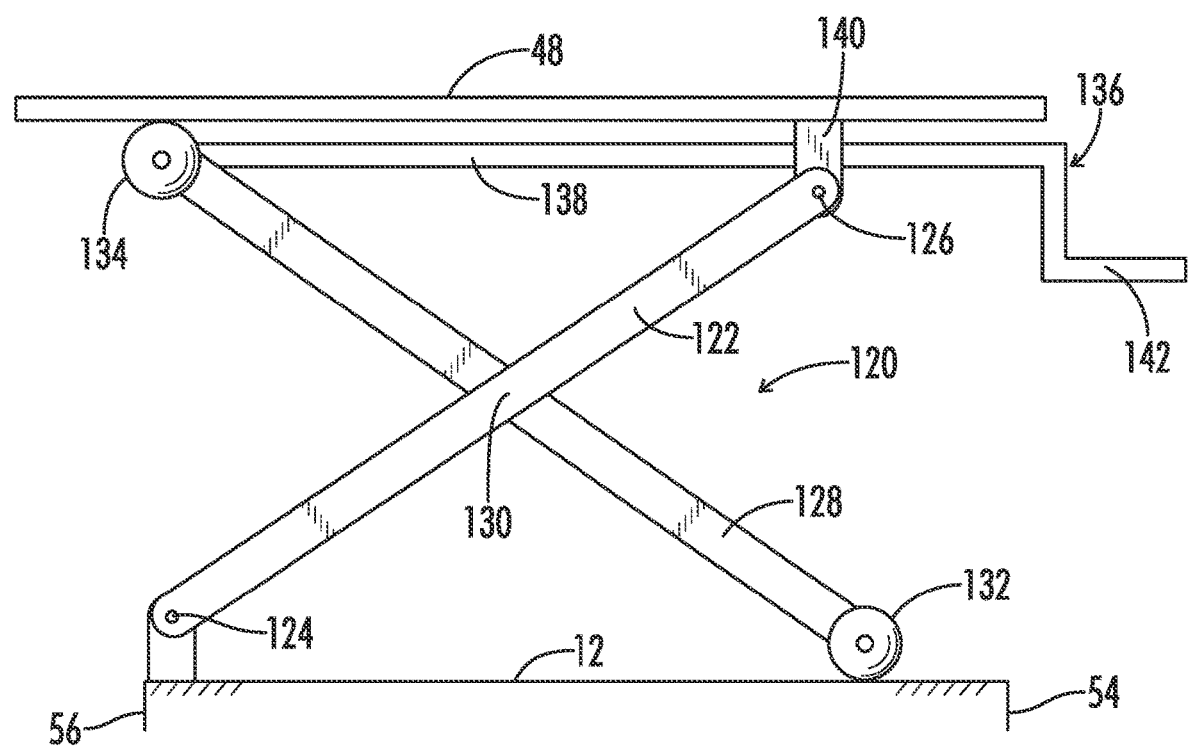
FIG. 14 is a schematic representation of another embodiment of a lifting linkage and lifting actuator.

In the embodiment of FIG. 14, a lifting linkage 120 includes a pivot link 122 pivotally connected at 124 to the machine frame 12 and at 126 to the operator's station 48. A supporting link 128 is pivotally attached to pivot link 122 at 130. Supporting link 128 has a lower roller 132 rolling on an upper surface of machine frame 12, and an upper roller 134 rollably supporting a lower surface of the operator's station 48. A lifting actuator 136 includes a threaded spindle 138 which is received in a threaded nut 140 held at the upper end of pivot link 122, so that rotation of the threaded spindle 138 causes the upper ends of the links 122 and 128 to move closer to or further from each other to raise or lower the operator's station 48 relative to the machine frame 12. As the operator's station is raised it also moves laterally to the left in FIG. 14, and as it is lowered it moves laterally to the right. The spindle 138 can be manually actuated as by handle 142, or can be rotated by a hydraulic or electric rotary actuator.

Figure 15:
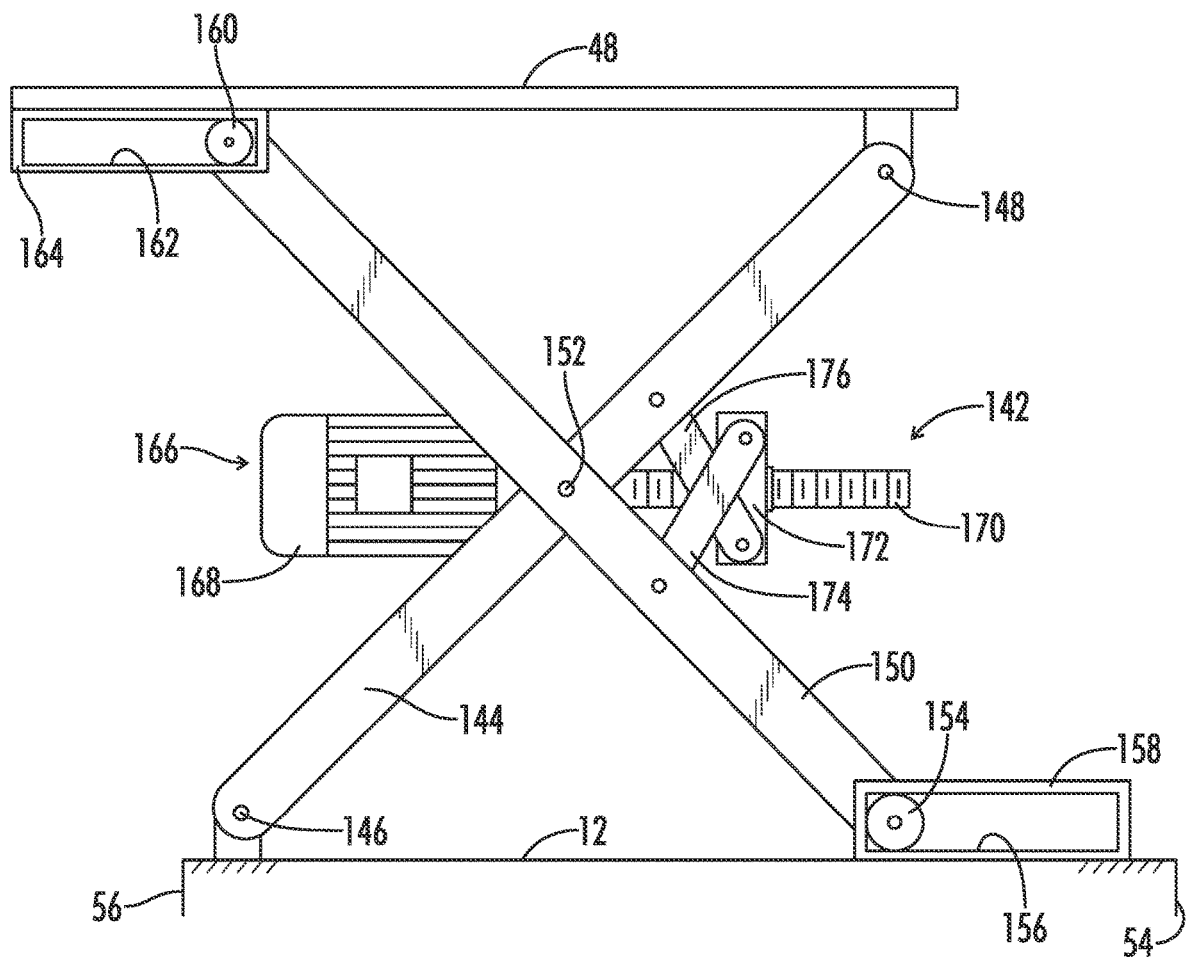
FIG. 15 is schematic representation of another embodiment of a lifting linkage and lifting actuator.

In the embodiment of FIG. 15, a lifting linkage 142 includes a pivot link 144 pivotally connected at 146 to the machine frame 12 and at 148 to the operator's station 48. A supporting link 150 is pivotally attached to pivot link 144 at 152. Supporting link 150 has a lower roller 154 which rolls along a slot 156 of guide 158 attached to machine frame 12, and an upper roller 160 which rolls along a slot 162 of a guide 164 attached to the operator's station 48. A lifting actuator 166 includes an electric motor 168 driving a threaded spindle 170 which is received in a threaded nut 172 held between scissor links 174 and 176, so that rotation of the threaded spindle 170 causes the upper ends of the links 144 and 150 to move closer to or further from each other to raise or lower the operator's station 48 relative to the machine frame 12. As the operator's station is raised it also moves laterally to the left in FIG. 15, and as it is lowered it moves laterally to the right. The spindle 170 could also be manually actuated as by handle as in FIG. 14, or can be rotated by any other suitable rotary actuator.

Figure 16:
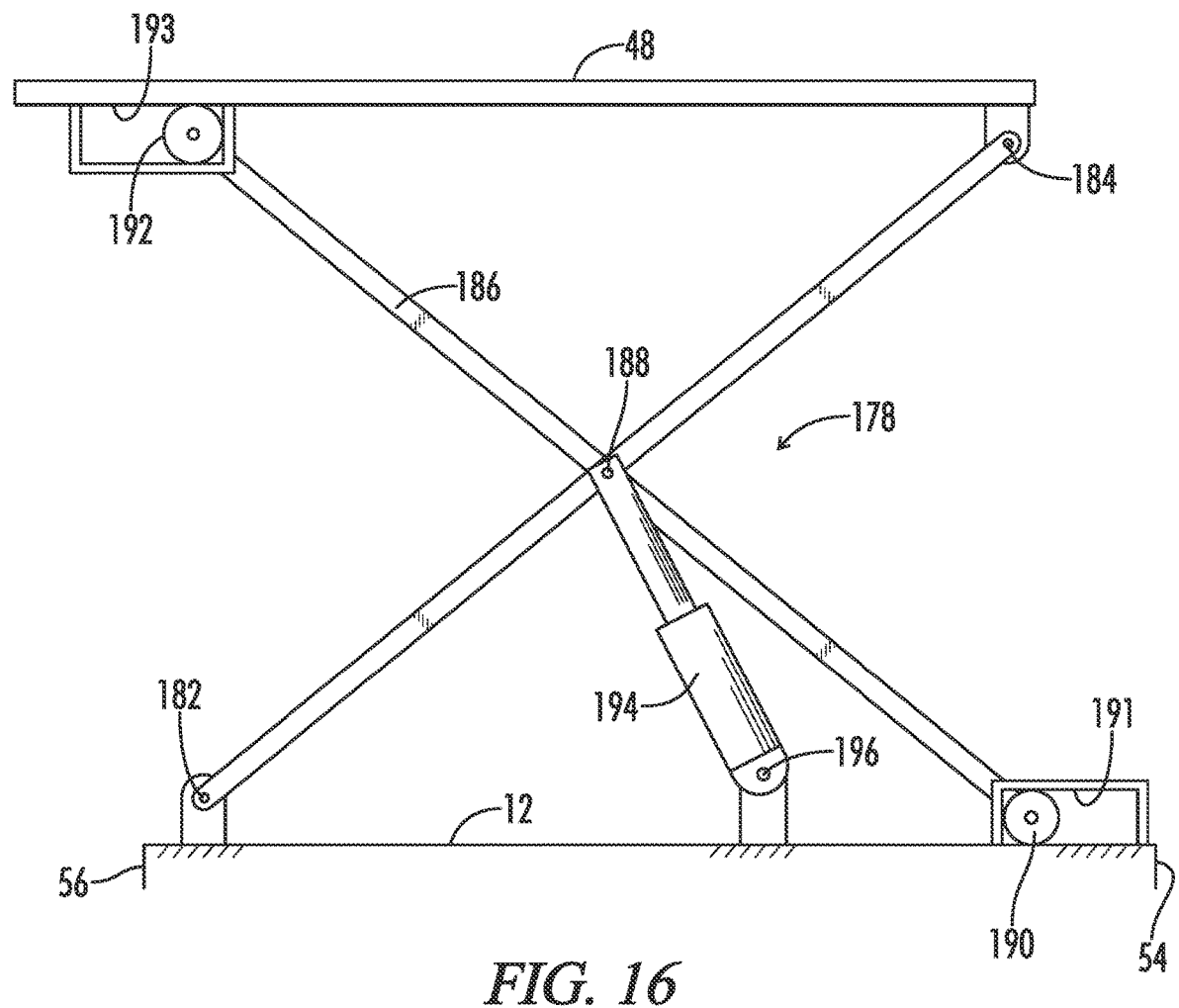
FIG. 16 is schematic representation of another embodiment of a lifting linkage and lifting actuator.

In the embodiment of FIG. 16, a lifting linkage 178 includes a pivot link 180 pivotally connected at 182 to the machine frame 12 and at 184 to the operator's station 48. A supporting link 186 is pivotally attached to pivot link 180 at 188. Supporting link 186 has a lower roller 190 rolling on an upper surface or in a track of machine frame 12, and an upper roller 192 rollably supporting a lower surface or track of the operator's station 48. A lifting actuator 194, which is shown as a hydraulic cylinder 194, is pivotally connected at 196 to machine frame 12 and to the pivotal connection 188. Extension or retraction of the hydraulic cylinder 194 pivots the pivot link 180 about the lower pivotal connection 182 to raise or lower the operator's station 48 relative to the machine frame 12. As the operator's station is raised it also moves laterally to the left in FIG. 1, and as it is lowered it moves laterally to the right. The hydraulic cylinder lifting actuator 194 could be replaced by any suitable linear actuator.

Figure 17A:
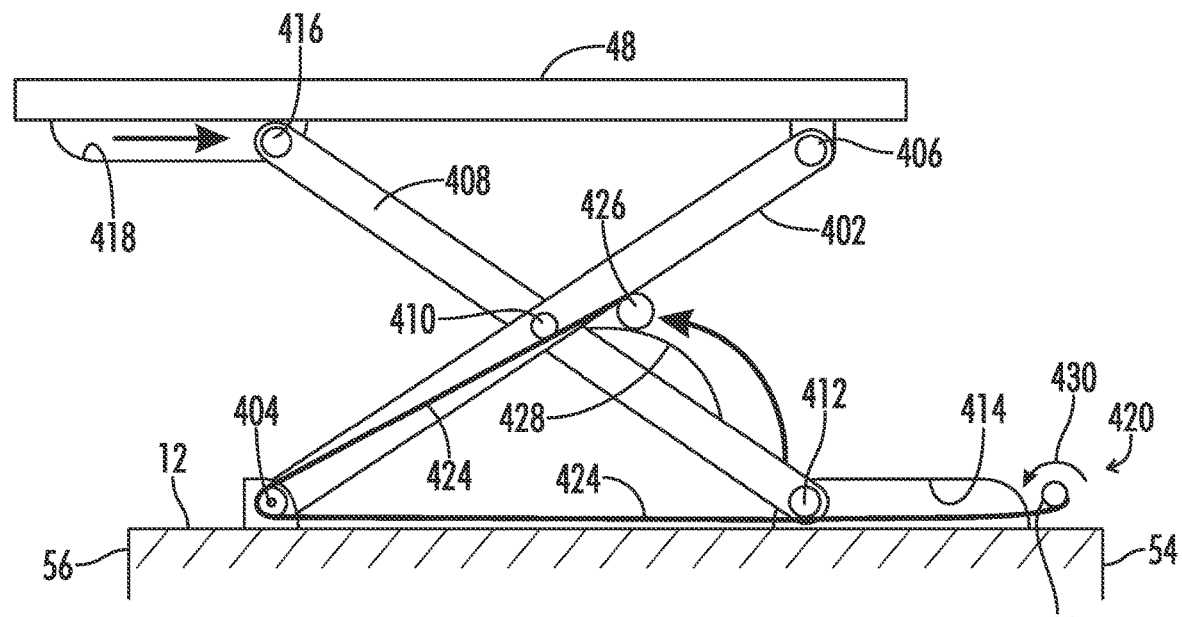
FIG. 17A is schematic representation of another embodiment of a lifting linkage and lifting actuator in a raised position.
Figure 17B:
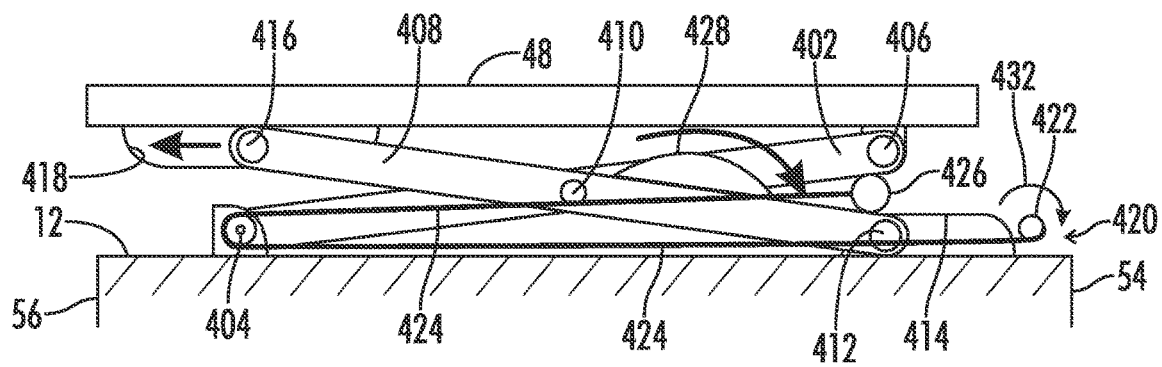
FIG. 17B is schematic representation of the lifting linkage and lifting actuator of FIG. 17A in a lowered position.

In the embodiment of FIGS. 17A and 17B, a lifting linkage 400 includes a pivot link 402 pivotally connected at 404 to the machine frame 12 and at 406 to the operator's station 48. A supporting link 408 is pivotally attached to pivot link 402 at 410. Supporting link 408 has a lower roller 412 rolling on an upper surface or in a track 414 of machine frame 12, and an upper roller 416 rollably supporting a lower surface or track 418 of the operator's station 48. A lifting actuator 420, which is schematically shown as a winch 420, is mounted on machine frame 12 and includes a winch drum on which one end of a winch belt or cable 424 is wound. The other end of the winch belt or cable 424 is attached to a roller schematically shown as 426. The roller 426 is constantly pulled to the left in FIGS. 17A and 17B by tension in the winch belt or cable 424.

In FIG. 17A the roller 426 is shown riding on top of an arch shaped protrusion of the support link 408. The roller 426 is constantly trapped between a lower surface of the pivot link 402 and the upper surface of the support link 408.

In FIG. 17B the roller 426 is displaced to the right, as compared to FIG. 17A, and is still trapped between the links 402 and 408. To raise the operator's station 48 from the lowered position of FIG. 17B to the raised position of FIG. 17A the winch belt or cable 424 is wound upon the winch drum 422 by rotating the winch drum 422 counterclockwise as indicated by the arrow 430 in FIG. 17A. This pulls the roller 426 to the left from the position of FIG. 17B toward the position of FIG. 17A. As the pivot link 402 pivots upward from the position of FIG. 17B towards the position of FIG. 17A the operator's station is rising and moving laterally to the left in the figures. The lower roller 412 of the support link 408 is moving to the left within the track 414 and the upper track 418 is moving to the left relative to the upper roller 416. To lower the operator's station 48 from the raised position of FIG. 17A the winch drum 422 is rotated clockwise as indicated by the arrow 432 in FIG. 17B and the weight of the operator's station acting downward due to gravity pushes the operator's station down toward the machine frame 12 as the roller 426 is squeezed between the links 402 and 408 back towards the position of FIG. 17B.

Operational Advantages:

The arrangement described above provides a movable operator's station having many advantages as compared to prior art systems such as for example those shown in U.S. Pat. No. 10,960,938.

A first advantage is that due to the lifting linkage 50 being configured to pivot about pivot axes 68 and 72 parallel to the longitudinal axis 14 of the machine frame 12, the operator's station 48 is moved laterally between the inner position 48A and the outermost position 48C without any fore or aft movement of the operator's station relative to the machine frame 12. This reduces the use of valuable floor space on the machine frame 12 and volume above that floor space as compared to a system like that of U.S. Pat. No. 10,960,938 wherein the operator's station also moves fore and aft as it is moved between its inner and outer positions.

A second advantage provided by the lifting linkage 50 being configured to pivot about pivot axes 68 and 72 parallel to the longitudinal axis 14 of the machine frame 12 is that in addition to providing lateral movement of the operator's station 48, the lifting linkage 50 lifts the operator's station 48 so that in either the intermediate outer position 48B or the outermost position 48C the operator's station 48 is raised in elevation thus providing an improved overall view around the milling machine 10 due to the higher elevation.

A third advantage provided by the lifting linkage 50 being configured to pivot about pivot axes 68 and 72 parallel to the longitudinal axis 14 of the machine frame 12 is that this permits the hydraulic lifting cylinder 66 to be arranged with the hydraulic accumulator 92 to provide a hydraulic spring support for the operator's station, thus providing improved comfort and safety for the operator.

Control System:

Referring now to FIG. 10, an automatic control system 200 for the road milling machine 10 is there schematically shown. The automatic control system 200 includes a controller 202. The controller 202 receives input signals from the various sensors described herein. The controller 202 may also receive other signals indicative of various operational functions of the road milling machine 10. Communication of control signals from the controller 202 to the various actuators such as 66 and 32 of the road milling machines 10 are schematically illustrated in FIG. 10 by the communication lines 204 and 206. It will be understood that the flow of hydraulic fluid to the hydraulic lifting cylinder 66 is controlled by the electro-hydraulic control valve 84 which receives electrical control signals conducted over communication line 204 from controller 202 in a known manner. Similarly, the extension actuator 32 will be directly controlled by another electro-hydraulic control valve (not shown) receiving electrical control signals conducted over communication line 206.

Similarly, the controller 202 may control the direction of the road milling machine 10 by steering of the ground engaging units 20A, 20B, 20C, 20D via their respective steering cylinders such as 38.

The controller 202 may control the extension of the lifting columns 26A and 26C in a similar manner.

Controller 202 includes or may be associated with a processor 208, a computer readable medium 210, a data base 212 and an input/output module or control panel 214 having a display 216. An input/output device 218, such as a keyboard or other user interface, is provided so that the human operator may input instructions to the controller. It is understood that the controller 202 described herein may be a single controller having all of the described functionality, or it may include multiple controllers wherein the described functionality is distributed among the multiple controllers.

Various operations, steps or algorithms as described in connection with the controller 202 can be embodied directly in hardware, in a computer program product 220 such as a software module executed by the processor 208, or in a combination of the two. The computer program product 220 can reside in RAM memory, flash memory, ROM memory, EPROM memory, EEPROM memory, registers, hard disk, a removable disk, or any other form of computer-readable medium 210 known in the art. An exemplary computer-readable medium 210 can be coupled to the processor 208 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

In addition to providing the various control features discussed above, the control system 200 can provide several modes of operation for preventing interference between the operator's station 48 and the movable lifting column 26A due to the superposition of the outer position 48C of the operator's station 48 and the extended position of the movable lifting column 26A.

It will be appreciated that due to the superposition of the outermost position 48C of the operator's station 48 and the fully extended position 26A''' of the movable lifting column 26A it is desirable to provide a system for preventing interference of those components with each other. This can be accomplished in any one of several modes of operation as further described below.

First Mode:

In a first mode of operation the controller 202 may receive an extension signal 222 from integral extension sensor 66S of the "smart" hydraulic lifting cylinder 66 and the pressure signal 81 from pressure sensor 83 associated with the cylinder end 86 of the hydraulic lifting cylinder 66. The extension signal 222 corresponds to an amount of extension of the hydraulic lifting cylinder 66. The pressure signal 81 corresponds to the hydraulic pressure within the cylinder end 86 of the hydraulic lifting cylinder 66.

The controller 202 may be configured to receive the extension signal 222 and the pressure signal 81 and to generate control signals 204 to the hydraulic lifting cylinder 66 such that when the operator's station 48 is moved toward the outermost position 48C, if the movable ground engaging unit 20A and the movable lifting column 26A are in the fully extended positions 20A''' and 26A''' and the operator's station 48 engages the movable lifting column 26A, the controller 202 detects a rise in hydraulic pressure within the hydraulic lifting cylinder 66 and directs the hydraulic lifting cylinder 66 to retract a predetermined distance to the intermediate outer position 48B to provide a predetermined clearance 223 (see FIG. 6) (for example 20 mm) between the operator's station 48 and the movable lifting column 26A.

Second Mode:

In a second mode of operation a proximity sensor 224 (see FIGS. 6 and 10) may be mounted on the operator's station 48 or optionally on the movable lifting column 26A and configured to provide a proximity signal 226 corresponding to a proximity of the operator's station 48 to the movable lifting column 26A. In this case the concern may be the possible interference of inner edge 65 of recess 64 with the movable lifting column 26A.

The controller 202 may be configured to receive the proximity signal 226 and to generate control signals 204 to the hydraulic lifting cylinder 66, the controller 202 being configured such that when the operator's station 48 is moved toward the outermost position 48C, if the movable ground engaging unit 20A and the movable lifting column 26A are in the fully extended positions 20A''' and 26A''' and the proximity sensor 224 detects the operator's station 48 within a predetermined distance of the movable lifting column 26C, the controller 202 directs the hydraulic lifting cylinder 66 to stop extending so as to provide a predetermined clearance 223 (for example 20 mm) between the operator's station 48 and the movable lifting column 26A, again leaving the operator's station 48 in the intermediate outer position 48B.
Third Mode:

A third mode of operation may be provided by configuring the pivoting mechanism which moves the movable ground engaging unit 20A and the movable lifting column 26A such that the extended position of the movable lifting column 26A is located so that the movable lifting column 26A cannot interfere with the operator's station 48, even if the operator's station 48 is in the outermost position 48C. This extended position of the movable lifting column 26A may be forward of the operator's station 48 in the intermediate extended position 26A" as schematically shown in FIG. 6. Or the extended position of the movable lifting column might be located laterally outward of the outermost position 48C of the operator's station. By so limiting the extended position of the movable lifting column 26A it is insured that the movable lifting column 26A cannot interfere with the operator's station 48, even if the operator's station 48 is in the outermost position 48C.

The limitation of the movement of the movable lifting column 26A can be provided by the physical geometry of the swing arm 28 and extension actuator 32, and various physical structures associated therewith, or the limitation of movement can be provided by control of the extension of the extension actuator 32 via the controller 202.

In this embodiment it is not necessary, however, for the extension actuator 32 to be a "smart" cylinder or to have an extension sensor 32S associated therewith. The extension actuator 32 can be a conventional or "dumb" hydraulic cylinder. In an embodiment using a conventional hydraulic cylinder for extension actuator 32, the limitation of the movement of the swing arm 28 may be provided by the physical geometry of the swing arm 28 and extension actuator 32, and various physical structures associated therewith. In another embodiment using a conventional hydraulic cylinder for extension actuator 32, the limitation of the movement of the swing arm 28 may be provided by the controller 202 using other position sensors detecting the position of the movable rear ground engaging unit relative to the machine frame 12.

Also, in this embodiment it is not necessary for the hydraulic lifting cylinder 66 to be a "smart" cylinder or to have an extension sensor 66S associated therewith. The hydraulic lifting cylinder 66 may be a conventional hydraulic cylinder. In an embodiment using a conventional hydraulic cylinder for hydraulic lifting cylinder 66, the limitation of the movement of the operator's station 48 may be provided by the physical geometry of the lifting linkage 50 and the various physical structures associated therewith. In another embodiment using a conventional hydraulic cylinder for hydraulic lifting cylinder 66, the limitation of the movement of the operator's station 48 may be provided by the controller 202 using other position sensors detecting the position of the operator's station 48 relative to the machine frame 12, for example the proximity sensor 67 or the rotary position sensor 69.

This third mode of operation may be described as a mode wherein the outer position of the operator's station 48 and the extended position of the movable ground engaging unit 20A are defined such that when the movable ground engaging unit is 20A in the extended position the operator's station 48 is movable between the inner position and the outer position without interference between the movable lifting column 26A and the operator's station 48, and such that when the operator's station 48 is in the outer position the movable ground engaging unit 20A is movable between the retracted position and the extended position without interference between the movable lifting column 26A and the operator's station 48A.
Fourth Mode:

A fourth mode of operation may be provided by configuring the lifting mechanism which moves the operator's station 48 such that the laterally outer movement from inner position 48A always terminates at intermediate outer position 48B which is chosen such that in position 48B a clearance 223 (see FIG. 6) is provided between the inner edge 65 of recess 64 of operator's station 48 and the movable lifting column 26A if the lifting column 26A is in its fully extended position 26A'''. By so limiting the outer position of the operator's station 48 it is insured that the movable lifting column 26A cannot interfere with the operator's station 48, even if the movable lifting column 26A is in the fully extended position 26A'''.

The limitation of the movement of the operator's station 48 can be provided by the physical geometry of the lifting linkage 50 and the hydraulic lifting cylinder 66, and various physical structures associated therewith, or the limitation of movement can be provided by control of the extension of the hydraulic lifting cylinder 66 via the controller 202 if the hydraulic lifting cylinder 66 has an extension sensor 66S associated therewith.

In this embodiment it is not necessary, however, for the hydraulic lifting cylinder 66 to be a "smart" cylinder or to have an extension sensor 66S associated therewith. The hydraulic lifting cylinder 66 may be a conventional hydraulic cylinder.

In an embodiment using a conventional hydraulic cylinder for hydraulic lifting cylinder 66, the limitation of the movement of the operator's station 48 may be provided by the physical geometry of the lifting linkage 50 and the various physical structures associated therewith. In another embodiment using a conventional hydraulic cylinder for hydraulic lifting cylinder 66, the limitation of the movement of the operator's station 48 may be provided by the controller 202 using other position sensors detecting the position of the operator's station 48 relative to the machine frame 12, for example the proximity sensor 67 or the rotary position sensor 69.

Also, in this embodiment it is not necessary for the extension actuator 32 to be a "smart" cylinder or to have an extension sensor 32S associated therewith.

This fourth mode of operation may also be described as a mode wherein the outer position of the operator's station 48 and the extended position of the movable ground engaging unit 20A are defined such that when the movable ground engaging unit is 20A in the extended position the operator's station 48 is movable between the inner position and the outer position without interference between the movable lifting column 26A and the operator's station 48, and such that when the operator's station 48 is in the outer position the movable ground engaging unit 20A is movable between the retracted position and the extended position without interference between the movable lifting column 26A and the operator's station 48A.
Fifth Mode:

In a fifth mode of operation the human operator can be provided with an operator interface, for example the interface 218, configured to let the human operator select between the third and fourth modes described above.

In this fifth mode of operation the hydraulic lifting cylinder 66 may be associated with a lifting cylinder extension sensor 66S configured to provide a cylinder extension signal 222 corresponding to the extension of the hydraulic lifting cylinder 66. This allows the hydraulic lifting cylinder to selectively define the outer position of the operator's station 48 as either the outermost position 48C or the intermediate outer position 48B.

In this fifth mode of operation the controller 202 may be configured to receive the cylinder extension signal 222 and the movable rear ground engaging unit position signal 221 and to generate control signals 204 and 206 to the hydraulic lifting cylinder 66 and to the extension actuator 32, the controller being configured such that:

in one operating mode (the Third Mode above) the extension actuator 32 is limited to movement of the movable rear ground engaging unit 20A between the retracted position 20A' and the intermediate extended position 20A", and the hydraulic lifting cylinder 66 is permitted to move the operator's station 48 to the outermost position 48C;

in another operating mode (the Fourth Mode above) the extension actuator 32 is permitted to move the movable ground engaging unit 20A to the fully extended position 20A''', and the hydraulic lifting cylinder 66 is limited to movement of the operator's station 48 between the inner position 48A and the intermediate outer position 48B; and wherein the controller 202 includes the operator interface 218 configured to let the human operator select between the one operating mode and the other operating mode.

Sixth Mode:

In a Sixth Mode of operation a proximity sensor 228 (see FIGS. 6 and 10) may be mounted on the operator's station 48 or optionally on the movable lifting column 46A and configured to provide a proximity signal 230 corresponding to a proximity of the operator's station 48 to the movable lifting column 26A. This can also be described as a proximity of the movable lifting column 26A to the operator's station 48. In this case the concern is that if the operator's station 48 is already in the outermost position 48C, and the operator then tries to move the movable lifting column 26A from the retracted position 26A' to the fully extended position 26A''', the moving lifting column 26A would impact the operator's station 48.

The controller 202 may be configured to receive the proximity signal 230 and to generate control signals 206 to the extension actuator 32, the controller 202 being configured such that when the operator's station 48 is in the outermost position 48C, and the proximity sensor 228 detects the operator's station 48 within a predetermined distance (for example 20 mm) of the movable lifting column 26A, the controller 202 directs the extension actuator 32 to stop so as to provide a predetermined clearance 232 (for example 20 mm)(see FIG. 6) between the operator's station 48 and the movable lifting column 26A in the intermediate extended position 26A" of the movable lifting column 26A.

Alternate Embodiment of FIGS. 18-19:

FIGS. 18 and 19 schematically represent a "large" milling machine like that of U.S. Pat. No. 10,968,576 incorporating certain aspects of the present disclosure. The milling machine is generally designated as 500. Those components analogous to the embodiment of FIGS. 1 and 2 carry the same identifying numbers. In the milling machine 500 the operator's station 48 is located longitudinally between the front tracks 20B, 20D and the rear tracks 20A, 20C.

In such a milling machine 500 there is no issue of interference of the shiftable operator's station 48 with any of the lifting columns. But there is still a need for an efficient mechanism for both lifting and laterally shifting the operator's station so as to give the operator an improved view of the engagement of the milling drum 502 with the ground surface being milled. Thus in FIG. 19 the operator's platform 48 is shown in dashed lines as schematically having been shifted over the right edge of the machine frame 12.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A self-propelled road milling machine, comprising:
   a machine frame having a longitudinal axis extending between a front and a rear of the machine frame, the machine frame including left and right edges;
   a plurality of ground engaging units for supporting the machine frame from a ground surface;
   a milling drum supported from the machine frame;
   an operator's station; and
   a support linkage including at least one pivot link extending between the machine frame and the operator's station, the at least one pivot link being oriented to pivot relative to the machine frame about a pivot axis extending parallel to the longitudinal axis of the machine frame, the support linkage being configured to move the operator's station laterally in a lateral direction transverse to the longitudinal axis of the machine frame between an inner position and an outer position relative to the machine frame, the outer position extending laterally partially beyond one of the left and right edges of the machine frame and the outer position being at a higher elevation than the inner position relative to the machine frame, the at least one pivot link being located below the operator's station and arranged to pivot from a less vertical orientation to a more vertical orientation as the operator's station is moved from the inner position to the outer position.

2. The self-propelled road milling machine of claim 1, further comprising:
   a hydraulic lifting cylinder connected to at least one of the support linkage and the operator's station, the hydraulic lifting cylinder being configured to move the operator's station between the inner and outer positions.

3. The self-propelled road milling machine of claim 2, further comprising:
   a hydraulic accumulator hydraulically communicated with the hydraulic lifting cylinder and configured to provide a hydraulic spring support to the operator's station at least when the operator's station is in the outer position.

4. The self-propelled road milling machine of claim 3, further comprising:
   a hydraulic flow restrictor disposed between the hydraulic lifting cylinder and the hydraulic accumulator and configured to restrict flow of hydraulic fluid in at least one direction between the hydraulic lifting cylinder and the hydraulic accumulator to dampen the hydraulic spring support of the operator's station.

5. The self-propelled road milling machine of claim 2, wherein:

the hydraulic lifting cylinder is a smart cylinder including an integral extension sensor, the integral extension sensor being configured to provide an extension signal corresponding to an extension of the hydraulic lifting cylinder and a corresponding position of the operator's station.

6. The self-propelled road milling machine of claim 1, further comprising:

a lifting actuator connected to at least one of the support linkage and the operator's station.

7. The self-propelled road milling machine of claim 6, wherein:

the lifting actuator is connected between the machine frame and the operator's station.

8. The self-propelled road milling machine of claim 6, further comprising:

a proximity sensor configured to detect the presence of the operator's station in the outer position relative to the machine frame.

9. The self-propelled road milling machine of claim 1, wherein:

the support linkage is configured to move the operator's station laterally between the inner position and the outer position without any fore or aft movement of the operator's station relative to the machine frame such that a footprint of the operator's station over the machine frame when moving between the inner and outer positions is minimized.

10. The self-propelled road milling machine of claim 1, wherein:

the outer position of the operator's station, as compared to the inner position, provides a human operator on the operator's station both an improved view of an area of the ground surface adjacent the milling drum due to a laterally outward movement of the operator's station from the inner position to the outer position, and an improved overall view around the self-propelled road milling machine due to the higher elevation of the outer position.

11. The self-propelled road milling machine of claim 1, wherein:

when the operator's station is in the inner position a stationary footprint of the operator's station falls entirely between the left and right edges of the machine frame.

12. A self-propelled road milling machine, comprising:

a machine frame having a longitudinal axis extending between a front and a rear of the machine frame, the machine frame including left and right edges;

a plurality of ground engaging units for supporting the machine frame from a ground surface;

a milling drum supported from the machine frame;

an operator's station; and a support linkage including at least one pivot link extending between the machine frame and the operator's station, the at least one pivot link being oriented to pivot relative to the machine frame about a pivot axis extending parallel to the longitudinal axis of the machine frame, the support linkage being configured to move the operator's station laterally in a lateral direction transverse to the longitudinal axis of the machine frame between an inner position and an outer position relative to the machine frame, the outer position extending laterally partially beyond one of the left and right edges of the machine frame and the outer position being at a higher elevation than the inner position relative to the machine frame;

wherein the plurality of ground engaging units includes at least one front ground engaging unit and at least two rear ground engaging units, and at least one of the rear ground engaging units is a movable rear ground engaging unit movable relative to the machine frame between a retracted position and an extended position;

wherein the milling drum is located such that when the movable rear ground engaging unit is in the retracted position the movable rear ground engaging unit is located ahead of the milling drum;

wherein the outer position of the operator's station extends laterally partially beyond one of the left and right edges of the machine frame adjacent the movable rear ground engaging unit;

wherein self-propelled road milling machine further includes at least two lifting columns extending between the at least two rear ground engaging units and the machine frame for raising and lowering the machine frame relative to the ground surface, one of the lifting columns being a movable lifting column attached to the movable rear ground engaging unit; and wherein the operator's station includes a recess configured to at least partially receive the movable lifting column when the movable rear ground engaging unit is in the extended position and the operator's station is in the outer position.

13. The self-propelled road milling machine of claim 12, wherein:

when the movable rear ground engaging unit is in the extended position the two rear ground engaging units are laterally aligned and the milling drum is located laterally between the two rear ground engaging units; and the operator's station when in the outer position is at least partially located above a location in which the movable rear ground engaging unit would be located if the movable rear ground engaging unit was in the extended position.

14. A self-propelled road milling machine, comprising:

a machine frame having a longitudinal axis extending between a front and a rear of the machine frame, the machine frame including left and right edges;

a plurality of ground engaging units for supporting the machine frame from a ground surface;

a milling drum supported from the machine frame;

an operator's station; and a support linkage including at least one pivot link extending between the machine frame and the operator's station, the at least one pivot link being oriented to pivot relative to the machine frame about a pivot axis extending parallel to the longitudinal axis of the machine frame, the support linkage being configured to move the operator's station laterally in a lateral direction transverse to the longitudinal axis of the machine frame between an inner position and an outer position relative to the machine frame, the outer position extending laterally partially beyond one of the left and right edges of the machine frame and the outer position being at a higher elevation than the inner position relative to the machine frame;

wherein the plurality of ground engaging units includes at least one front ground engaging unit and at least two rear ground engaging units, and at least one of the rear ground engaging units is a movable rear ground engaging unit movable relative to the machine frame between a retracted position and an extended position;

wherein the milling drum is located such that when the movable rear ground engaging unit is in the retracted position the movable rear ground engaging unit is located ahead of the milling drum;

wherein the outer position of the operator's station extends laterally partially beyond one of the left and right edges of the machine frame adjacent the movable rear ground engaging unit;

wherein the self-propelled road milling machine further includes:

a hydraulic lifting cylinder connected to at least one of the support linkage and the operator's station, the hydraulic lifting cylinder being configured to move the operator's station between the inner and outer positions;

an extension sensor configured to provide an extension signal corresponding to an extension of the hydraulic lifting cylinder;

a pressure sensor configured to provide a pressure signal corresponding to a hydraulic pressure within the hydraulic lifting cylinder;

a movable lifting column extending between the movable rear ground engaging unit and the machine frame for raising and lowering the machine frame relative to the ground surface; and a controller configured to receive the extension signal and the pressure signal and to generate control signals to the hydraulic lifting cylinder, the controller being configured such that when the operator's station is moved toward the outer position, if the movable ground engaging unit and the movable lifting column are in the extended position and the operator's station engages the movable lifting column, the controller detects a rise in hydraulic pressure within the hydraulic lifting cylinder and directs the hydraulic lifting cylinder to move a predetermined distance to provide a predetermined clearance between the operator's station and the movable lifting column in the outer position of the operator's station.

15. A self-propelled road milling machine, comprising:

a machine frame having a longitudinal axis extending between a front and a rear of the machine frame, the machine frame including left and right edges;

a plurality of ground engaging units for supporting the machine frame from a ground surface;

a milling drum supported from the machine frame;

an operator's station; and a support linkage including at least one pivot link extending between the machine frame and the operator's station, the at least one pivot link being oriented to pivot relative to the machine frame about a pivot axis extending parallel to the longitudinal axis of the machine frame, the support linkage being configured to move the operator's station laterally in a lateral direction transverse to the longitudinal axis of the machine frame between an inner position and an outer position relative to the machine frame, the outer position extending laterally partially beyond one of the left and right edges of the machine frame and the outer position being at a higher elevation than the inner position relative to the machine frame;

wherein the plurality of ground engaging units includes at least one front ground engaging unit and at least two rear ground engaging units, and at least one of the rear ground engaging units is a movable rear ground engaging unit movable relative to the machine frame between a retracted position and an extended position;

wherein the milling drum is located such that when the movable rear ground engaging unit is in the retracted position the movable rear ground engaging unit is located ahead of the milling drum; and wherein the outer position of the operator's station extends laterally partially beyond one of the left and right edges of the machine frame adjacent the movable rear ground engaging unit;

wherein the self-propelled road milling machine further includes:

a lifting actuator connected to at least one of the support linkage and the operator's station, the lifting actuator being configured to move the operator's station between the inner and outer positions;

a movable lifting column extending between the movable rear ground engaging unit and the machine frame for raising and lowering the machine frame relative to the ground surface;

a proximity sensor configured to provide a proximity signal corresponding to a proximity of the operator's station to the movable lifting column; and a controller configured to receive the proximity signal and to generate control signals to the lifting actuator, the controller being configured such that when the operator's station is moved toward the outer position, if the movable ground engaging unit and the movable lifting column are in the extended position and the proximity sensor detects the operator's station within a predetermined distance of the movable lifting column, the controller directs the lifting actuator to stop moving so as to provide a predetermined clearance between the operator's station and the movable lifting column in the outer position of the operator's station.

16. A self-propelled road milling machine, comprising:

a machine frame having a longitudinal axis extending between a front and a rear of the machine frame, the machine frame including left and right edges;

a plurality of ground engaging units for supporting the machine frame from a ground surface;

a milling drum supported from the machine frame;

an operator's station; and a support linkage including at least one pivot link extending between the machine frame and the operator's station, the at least one pivot link being oriented to pivot relative to the machine frame about a pivot axis extending parallel to the longitudinal axis of the machine frame, the support linkage being configured to move the operator's station laterally in a lateral direction transverse to the longitudinal axis of the machine frame between an inner position and an outer position relative to the machine frame, the outer position extending laterally partially beyond one of the left and right edges of the machine frame and the outer position being at a higher elevation than the inner position relative to the machine frame;

wherein the plurality of ground engaging units includes at least one front ground engaging unit and at least two rear ground engaging units, and at least one of the rear ground engaging units is a movable rear ground engaging unit movable relative to the machine frame between a retracted position and an extended position;

wherein the milling drum is located such that when the movable rear ground engaging unit is in the retracted position the movable rear ground engaging unit is located ahead of the milling drum; and wherein the outer position of the operator's station extends laterally partially beyond one of the left and right edges of the machine frame adjacent the movable rear ground engaging unit;

wherein the self-propelled road milling machine further includes a movable lifting column extending between the movable rear ground engaging unit and the machine frame for raising and lowering the machine frame relative to the ground surface; and wherein the outer position of the operator's station and the extended position of the movable ground engaging unit are defined such that when the movable ground engaging unit is in the extended position the operator's station is movable between the inner position and the outer position without interference between the movable lifting column and the operator's station, and such that when the operator's station is in the outer position the movable ground engaging unit is movable between the retracted position and the extended position without interference between the movable lifting column and the operator's station.

17. The self-propelled road milling machine of claim 16, wherein:
when the movable rear ground engaging unit is in the extended position the movable rear ground engaging unit is located forward relative to the other of the rear ground engaging units.

18. The self-propelled road milling machine of claim 16, wherein:
when the movable rear ground engaging unit is in the extended position the two rear ground engaging units are laterally aligned and the milling drum is located laterally between the two rear ground engaging units; and
when the operator's station is in the outer position and the movable rear ground engaging unit is in the extended position, the movable lifting column is located laterally outward of the operator's station so that the movable lifting column does not interfere with the operator's station.

19. A self-propelled road milling machine, comprising:
a machine frame having a longitudinal axis extending between a front and a rear of the machine frame, the machine frame including left and right edges;
a plurality of ground engaging units for supporting the machine frame from a ground surface;
a milling drum supported from the machine frame;
an operator's station; and
a support linkage including at least one pivot link extending between the machine frame and the operator's station, the at least one pivot link being oriented to pivot relative to the machine frame about a pivot axis extending parallel to the longitudinal axis of the machine frame, the support linkage being configured to move the operator's station laterally in a lateral direction transverse to the longitudinal axis of the machine frame between an inner position and an outer position relative to the machine frame, the outer position extending laterally partially beyond one of the left and right edges of the machine frame and the outer position being at a higher elevation than the inner position relative to the machine frame;
wherein the plurality of ground engaging units includes at least one front ground engaging unit and at least two rear ground engaging units, and at least one of the rear ground engaging units is a movable rear ground engaging unit movable relative to the machine frame between a retracted position and an extended position;

wherein the milling drum is located such that when the movable rear ground engaging unit is in the retracted position the movable rear ground engaging unit is located ahead of the milling drum; and wherein the outer position of the operator's station extends laterally partially beyond one of the left and right edges of the machine frame adjacent the movable rear ground engaging unit;

wherein the self-propelled road milling machine further includes:
a lifting actuator connected to at least one of the support linkage and the operator's station, the lifting actuator being configured to move the operator's station between the inner and outer positions and an intermediate outer position;
a lifting actuator extension sensor configured to provide a lifting actuator extension signal corresponding to an extension of the lifting actuator;
a movable lifting column extending between the movable rear ground engaging unit and the machine frame for raising and lowering the machine frame relative to the ground surface;
an extension actuator configured to move the movable rear ground engaging unit and the movable lifting column between the retracted position and the extended position and an intermediate extended position;
an extension actuator extension sensor configured to provide a movable rear ground engaging unit position signal corresponding to a position of the movable rear ground engaging unit relative to the machine frame; and
a controller configured to receive the lifting actuator extension signal and the movable rear ground engaging unit position signal and to generate control signals to the lifting actuator and to the extension actuator, the controller being configured such that:
in one operating mode the extension actuator is limited to movement of the movable rear ground engaging unit between the retracted position and the intermediate extended position, and the lifting actuator is permitted to move the operator's station to the outer position;
in another operating mode the extension actuator is permitted to move the movable ground engaging unit to the extended position, and the lifting actuator is limited to movement of the operator's station between the inner position and the intermediate outer position; and
wherein the controller includes an operator interface configured to let a human operator select between the one operating mode and the another operating mode.

20. A self-propelled road milling machine, comprising:
a machine frame having a longitudinal axis extending between a front and a rear of the machine frame, the machine frame including left and right edges;
a plurality of ground engaging units for supporting the machine frame from a ground surface;
a milling drum supported from the machine frame;
an operator's station; and
a support linkage including at least one pivot link extending between the machine frame and the operator's station, the at least one pivot link being oriented to pivot relative to the machine frame about a pivot axis extending parallel to the longitudinal axis of the machine frame, the support linkage being configured to move the operator's station laterally in a lateral direction transverse to the longitudinal axis of the machine frame between an inner position and an outer position relative to the machine frame, the outer position extending laterally partially beyond one of the left and right edges of the machine frame and the outer position being at a higher elevation than the inner position relative to the machine frame;

wherein the plurality of ground engaging units includes at least one front ground engaging unit and at least two rear ground engaging units, and at least one of the rear ground engaging units is a movable rear ground engaging unit movable relative to the machine frame between a retracted position and an extended position;

wherein the milling drum is located such that when the movable rear ground engaging unit is in the retracted position the movable rear ground engaging unit is located ahead of the milling drum; and wherein the outer position of the operator's station extends laterally partially beyond one of the left and right edges of the machine frame adjacent the movable rear ground engaging unit;

wherein the self-propelled road milling machine further includes:

a movable lifting column extending between the movable rear ground engaging unit and the machine frame for raising and lowering the machine frame relative to the ground surface;

an extension actuator configured to move the movable rear ground engaging unit and the movable lifting column between the retracted position and the extended position;

a proximity sensor configured to provide a proximity signal corresponding to a proximity of the operator's station to the movable lifting column; and a controller configured to receive the proximity signal and to generate control signals to the extension actuator, the controller being configured such that when the operator's station is in the outer position, and the proximity sensor detects the operator's station within a predetermined distance of the movable lifting column, the controller directs the extension actuator to stop so as to provide a predetermined clearance between the operator's station and the movable lifting column in the extended position of the movable rear ground engaging unit and the movable lifting column.

\* \* \* \* \*